US008947696B1

(12) United States Patent
Uyttendaele

(10) Patent No.: US 8,947,696 B1
(45) Date of Patent: Feb. 3, 2015

(54) APPARATUSES, METHODS AND SYSTEMS FOR RICH INTERNET/CLOUD PRINTING AND PRINT PRODUCT TRAFFIC CONTROL MANAGEMENT

(75) Inventor: David Jacques Uyttendaele, New York, NY (US)

(73) Assignee: Mimeo.com, Inc., New York, NY (US)

( * ) Notice: Subject to any disclaimer, the term of this patent is extended or adjusted under 35 U.S.C. 154(b) by 1207 days.

(21) Appl. No.: 12/471,003

(22) Filed: May 22, 2009

Related U.S. Application Data

(60) Provisional application No. 61/055,226, filed on May 22, 2008, provisional application No. 61/055,366, filed on May 22, 2008, provisional application No. 61/096,736, filed on Sep. 12, 2008.

(51) Int. Cl.
G06F 3/12 (2006.01)

(52) U.S. Cl.
USPC ........................................................ 358/1.15

(58) Field of Classification Search
CPC .............................. G06F 3/1261; G06F 3/1255
See application file for complete search history.

(56) References Cited

U.S. PATENT DOCUMENTS

| | | | | |
|---|---|---|---|---|
| 6,078,906 | A * | 6/2000 | Huberman | 705/37 |
| 6,864,993 | B1 * | 3/2005 | Roberts et al. | 358/1.9 |
| 6,921,220 | B2 * | 7/2005 | Aiyama | 400/76 |
| 7,042,585 | B1 * | 5/2006 | Whitmarsh et al. | 358/1.15 |
| 7,086,001 | B1 * | 8/2006 | Hicks et al. | 715/209 |
| 2001/0043357 | A1 * | 11/2001 | Owa et al. | 358/1.15 |
| 2002/0059489 | A1 * | 5/2002 | Davis et al. | 710/72 |
| 2002/0063887 | A1 * | 5/2002 | White | 358/1.15 |
| 2002/0075509 | A1 * | 6/2002 | Wiechers | 358/1.15 |
| 2002/0078160 | A1 * | 6/2002 | Kemp et al. | 709/208 |

(Continued)

OTHER PUBLICATIONS

Canon Laser imageRUNNER 7086, posted on May 13, 2007, Retrieved from the Internet: URL: http://web.archive.org/web/20070513130820/http://www.usa.canon.com/opd/controller?act=OPDModelDetailAct&fcategoryid=2193&modelid=12790 (retrieved on Nov. 10, 2011).

(Continued)

Primary Examiner — King Poon
Assistant Examiner — Vincent Peren
(74) Attorney, Agent, or Firm — LaBatt, LLC

(57) ABSTRACT

This disclosure details the implementation of apparatuses, methods and systems for a Rich Internet Printing and Print product traffic control Manager (hereinafter, "Manager"). The high volume and varied makeup of modern printing needs may render some confused as to the best printing mode for a given job. Often, individuals will settle into a routine of using the same printer, printing mode, printing service, and/or the like for all jobs regardless of whether a different printing method may be preferable or more nearly suited to the job at hand. The Manager may serve as an intermediary agency to direct print jobs to one or more particular printing methods, internal or external document production agencies, printers, and/or the like that are deemed most suitable for the printing job at hand. In an embodiment, the Manager may comprise a single print driver that may be installed on a local computer system. Once installed, a Manager print option may appear among the other printer options in a print menu. By selecting the Manager print option and issuing a print command, a user may direct his or her print job directly to the Manager for analysis and routing to an appropriate printing method, printer, agency, and/or the like.

27 Claims, 15 Drawing Sheets

(56) References Cited

U.S. PATENT DOCUMENTS

| | | | |
|---|---|---|---|
| 2002/0090240 A1* | 7/2002 | Lively | 400/76 |
| 2002/0135798 A1* | 9/2002 | Simpson et al. | 358/1.15 |
| 2002/0154335 A1* | 10/2002 | Matoba et al. | 358/1.15 |
| 2002/0184137 A1* | 12/2002 | Oakeson et al. | 705/37 |
| 2003/0011801 A1* | 1/2003 | Simpson et al. | 358/1.13 |
| 2003/0011805 A1* | 1/2003 | Yacoub | 358/1.15 |
| 2004/0111430 A1* | 6/2004 | Hertling et al. | 707/104.1 |
| 2004/0193696 A1* | 9/2004 | Howard et al. | 709/217 |
| 2007/0127058 A1* | 6/2007 | Eldridge | 358/1.15 |
| 2007/0229896 A1* | 10/2007 | Fujimori et al. | 358/1.16 |
| 2008/0180699 A1* | 7/2008 | Selvaraj | 358/1.1 |
| 2009/0006176 A1* | 1/2009 | Handley | 705/10 |

OTHER PUBLICATIONS

Edward F. Moltzen "HP Launches Sweeping Expansion of Channel Print Efforts", posted on Dec. 5, 2007, Retrieved from the Internet: URL: http://www.cm.com/news/channel-programs/204700965/hp-launches-sweeping-expansion-of-channel-print-efforts.htm?itc=refresh (retrieved on Oct. 10, 2011).

Grant Skinner "Failure to Unload: Flash Player 9's Dirty Secret", posted on Apr. 7, 2008, Retrieved from the Internet: URL: http://gskinner.com/blog/archives/2008/04/failure_to_unlo.html (retrieved on Oct. 10, 2011).

Raghunath Rao Thricovil "Introduction to RIA", posted on May 2, 2008, Retrieved from the Internet: URL: http://raghunathrao.com/share/Intro%20To%20RIA.pdf (retrieved on Oct. 28, 2011).

* cited by examiner

FIGURE 8B

Providers 8 45

Service Providers [MANAGE]

- Acme Corp
  - New York
    - Mail Room/Copy Center
    - 3rd Floor
      - HP B&W Inkjet
      - HP B&W Inkjet
    - 5th Floor
      - Canon Laser
      - HP Laser
  - San Francisco
- Mimeo.com
- FedEx Kinko's
- PostersPrinting.com 8 48
8 50

Mimeo.com (http://services.mimeo.com)    8 52
8 55
8 58
Display Name [Mimeo]

Products 8 60                                    Edit
12 of 137 Products Enabled

Locations 8 65                                   Edit
U.S. Domestic (Enabled)
International (Enabled)
Custom Destinations (42)

Cutoffs & SLAs 8 70                              Edit
U.S. Domestic (Next Day)
International (1-8 Days)
Custom Destinations (Same Day, Next Day, ...)

Rules 8 75                                       Edit
4 Rules Currently Configured

Service Config 8 80                              Edit
http://services.mimeo.com ary agency to direct print jobs to one or more particular printing methods, internal or external document production agencies, printers, and/or the like that are deemed most suitable for the printing job at hand. The Manager is capable of routing print jobs to and across multiple print devices and/or services spanning a local, domestic, international, or global network of document reproduction resources. In an embodiment, the Manager may comprise a single print driver that may be installed on a local
US 8,947,696 B1

APPARATUSES, METHODS AND SYSTEMS FOR RICH INTERNET/CLOUD PRINTING AND PRINT PRODUCT TRAFFIC CONTROL MANAGEMENT

PRIORITY CLAIM AND RELATED APPLICATIONS

This is a Non-Provisional of prior Provisional application Ser. No. 61/055,226, filed May 22, 2008, entitled, "Apparatuses, Methods, and Systems for a Print product traffic control Manager,"; prior Provisional application Ser. No. 61/055,366, filed May 22, 2008, entitled, "Apparatuses, Methods, and Systems for a Print product traffic control Manager,"; and prior Provisional application Ser. No. 61/096,736, filed Sep. 12, 2008, entitled, "APPARATUSES, METHODS, AND SYSTEMS FOR A PRINT PRODUCT TRAFFIC CONTROL MANAGER,", to all of which priority under 35 U.S.C. §119 is claimed.

The entire contents of the aforementioned applications are herein expressly incorporated by reference.

FIELD

The present invention is directed generally to apparatuses, methods, and systems of document management, to APPARATUSES, METHODS AND SYSTEMS FOR RICH INTERNET/CLOUD PRINTING AND PRINT PRODUCT TRAFFIC CONTROL MANAGEMENT.

BACKGROUND

In printing a document, various options are often available, particularly at the enterprise level. For example, an individual may print a document to a simple, local printer, a more advanced color or laser printer, a copy machine, and/or the like. Often, different printer drivers are installed on the individual's computer to format a given print job for the particular printer or printing method that the individual wishes to use. Other printing options have also come about, such as printing to a file (e.g., PDF, XPS, etc.) or printing via the assistance of a specially designated department (e.g., printing, reproduction, word processing, etc). Various external document production agencies may also provide printing services, including specialty services such as binding, special paper, high quality printing, and/or the like.

SUMMARY

This disclosure details the implementation of apparatuses, methods and systems for a Rich Internet Printing and Print product traffic control Manager (hereinafter, "Manager"). The high volume and varied makeup of modern printing needs may render some confused as to the best printing mode for a given job. Often, individuals will settle into a routine of using the same printer, printing mode, printing service, and/or the like for all jobs regardless of whether a different printing method may be preferable or more nearly suited to the job at hand. The Manager may serve as an intermediary agency to direct print jobs to one or more particular printing methods, internal or external document production agencies, printers, and/or the like that are deemed most suitable for the printing job at hand. The Manager is capable of routing print jobs to and across multiple print devices and/or services spanning a local, domestic, international, or global network of document reproduction resources. In an embodiment, the Manager may comprise a single print driver that may be installed on a local computer system. Once installed, a Manager print option may appear among the other printer options in a print menu. In an alternative embodiment, Manager components may be configured within, as part of, and/or in association with one or more rich media web applications for printing rich media content, and may require no such installation. It should also be noted that the Manager may be implemented to run in the Cloud, over a distributed communication network, and/or the like. By selecting the Manager print option and issuing a print command, a user may direct his or her print job directly to the Manager for analysis and routing to an appropriate printing method, printer, agency, and/or the like.

In one embodiment, a processor-implemented method for routing document reproduction requests is disclosed, comprising: receiving a document reproduction request and a document; analyzing the document based on a set of document classification criteria to determine a document classification; determining a reproduction destination based on the document classification and a reproduction routing schedule; and directing the document to the reproduction destination.

In another embodiment, a processor-implemented method for routing document reproduction requests is disclosed, comprising: receiving a document reproduction request; analyzing the document reproduction request based on a set of reproduction request criteria to determine a reproduction request classification; comparing the reproduction request classification to a plurality of reproduction facility records to determine a reproduction facility; and directing the document to the reproduction facility.

BRIEF DESCRIPTION OF THE DRAWINGS

The accompanying appendices and/or drawings illustrate various non-limiting, example, inventive aspects in accordance with the present disclosure:

FIG. 8B shows aspects of an implementation of a PSP profile in one embodiment of Manager operation;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

In order to address various issues and improve over the prior art, the invention is directed to apparatuses, methods and systems for rich internet printing and print product traffic control management. It is to be understood that, depending on the particular needs and/or characteristics of a Manager individual and/or enterprise user, reproduction method and/or agency, server, content and/or document type, content source, data transmission and/or network framework, and/or the like, various embodiments of the Manager may be implemented that enable a great deal of flexibility and customization. The instant disclosure discusses an embodiment of the Manager primarily within the context of enterprise document reproduction and/or printing. However, it is to be understood that the system described herein may be readily configured/customized for a wide range of other applications or implementations. For example, aspects of the Manager may be adapted for non-enterprise and/or small scale document reproduction, electronic reproduction, document access management, and/or the like applications. Aspects of the Manager may further be adapted, in some embodiments, to capture of content, such as rich internet application generated content and/or other multimedia content, and intelligent selection of one or more user interfaces, output devices, and/or the like for provision and/or display of captured content. It is to be understood that the Manager may be further adapted to other implementations or document management and/or reproduction applications.

Manager

Figure 1:
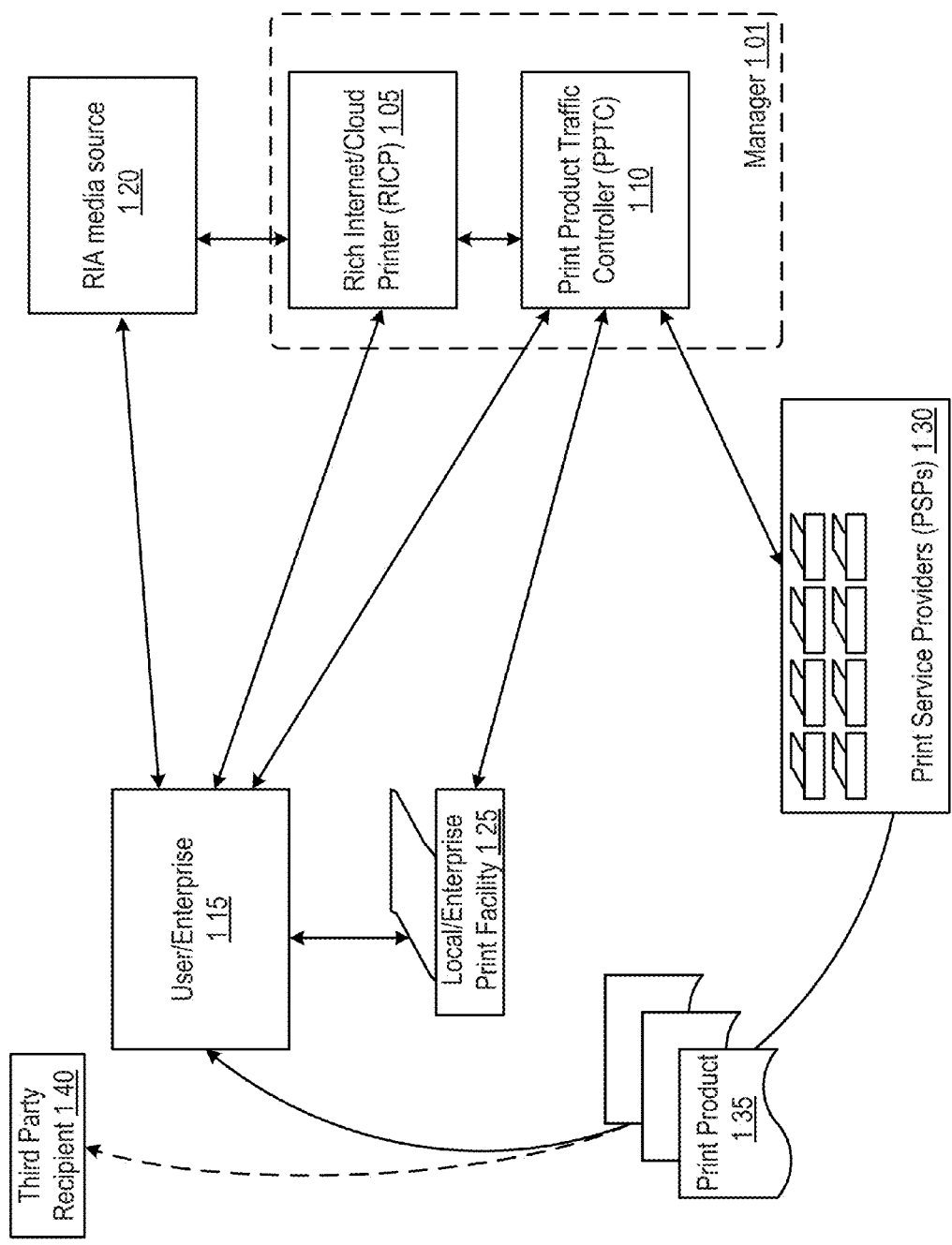
FIG. 1 shows data flow between Manager components and/or affiliated entities in one embodiment of Manager operation.

FIG. 1 shows data flow between Manager components and/or affiliated entities in one embodiment of Manager operation. In one implementation, a Manager 101 may comprise both Rich Internet/cloud Printer (hereinafter, "RIP") 105 and Print product traffic controller (hereinafter, "PPTC") components 110. In alternative implementations, the RICP 105 and PPTC 110 facilities may be independently housed, controlled, managed, and/or the like. In one embodiment, the RICP 105 may serve to facilitate standardized and sophisticated content capture and print capabilities for multimedia content associated with modern internet technology, rich internet applications (hereinafter, "RIAs"), so-called web 2.0 applications and/or services, and/or the like. In one embodiment, the PPTC 110 may serve to facilitate intelligent routing of print jobs and/or complex reproduction requests of documents, multimedia content, and/or the like to and from various available print facilities, including local and/or enterprise print facilities, remote print service providers (hereinafter, "PSPs"), and or the like. In various implementations, PSPs may comprise third party document production services, in-house and/or enterprise document production, print resource networks, cloud-based services, Managers, PPTCs, and/or the like. PPTC routing may be based on a wide variety of factors such as, in some implementations, print job content (e.g., color, detail, size, etc.), reproduction request specifications (e.g., paper type, binding, delivery time, delivery location, print destination selection, etc.), user profile, print facility capabilities, and/or the like.

In one implementation, an individual and/or enterprise user 115 may directly engage the PPTC 110 in order to have print jobs and/or document reproduction requests routed to and/or among various available print facilities thereby. In one implementation, user-level access to the PPTC may be facilitated by print driver software installed at a user, enterprise, network and/or the like computer system and configured to direct one or more print jobs and/or document reproduction requests to the PPTC for re-routing to one or more print facilities. The PPTC may route some print jobs to one or more local and/or enterprise print facilities 125, such as a local printer, network printer, enterprise print and/or reproduction department, and/or the like. The PPTC may route print jobs to one or more PSPs, which may generate print products 135 in accordance with instructions received from and/or relayed by the PPTC 110, and deliver generated print products 135 to the user/enterprise 115 and/or to one or more third party recipients 140 specified in the print instructions.

In one implementation, a user 115 may employ RICP features and/or functionality to enable printing of media content derived from internet sources, such as RIA media sources 120. In the instant specification, RIA sources should be understood to include those internet content sources implemented using Adobe Flash/Flex, Microsoft Silverlight, HTML/AJAX, Java/JavaFX, and/or any other software technologies configured to generate rich user interface experiences approaching the sophisticated look and functionality of desktop software over network resources. A user 115 may engage an RIA media source 120 to retrieve RIA media content. In one implementation, the RIA media source 120 may engage the RICP 105 upon receipt of an indication from the user 115 of a desire to print RIA media content. The RICP 105 may then generate a print user interface (UI) for provision and display to the user 115, allowing the user to provide print specifications and/or print product attributes relevant to RICP printing and/or production of a final print product related to selected RIA media content 120. In an alternative implementation, a client-side computer system associated with the user/enterprise 115 may detect an attempt to print RIA media content and directly engage RICP functionality to facilitate RIA media content printing. The RICP 105 may subsequently capture selected media content, convert content to one or more page description language (hereinafter, "PDL") formats (e.g., Adobe Portable Document Format [PDF], Microsoft XML Paper Specification [XPS], Postscript, PNG, JPEG, GIF, TIFF, XSLFO, HTML, and/or the like), and direct converted media content to one or more print facilities, such as a local/enterprise print facility 125. In one implementation, the RICP 105 may interface with the PPTC 110 to pass captured RIA media content thereto for routing to one or more appropriately selected print facilities. Coupling of the RICP 105 and PPTC 110 provides distinct advantages for printing rich media content inasmuch as the PPTC may direct complex and/or variegated multimedia content to print facilities best suited to faithfully reproduce that content.

Figure 2:
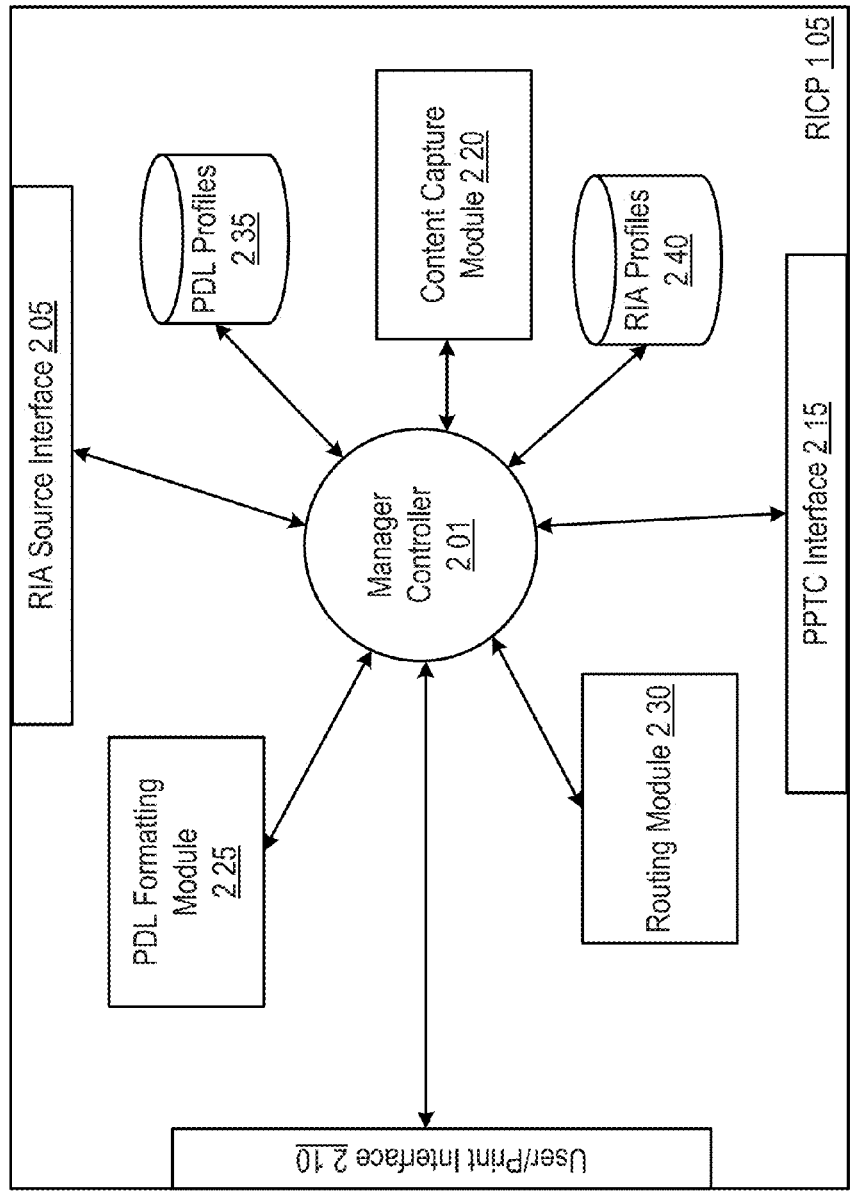
FIG. 2 shows aspects of RICP system components in one embodiment of Manager operation.

FIG. 2 shows aspects of RICP system components in one embodiment of Manager operation. The RICP 105 may contain a number of functional and/or computational modules and/or data stores. A Manager controller 201 may serve a central role in some embodiments of Manager operation, serving to orchestrate the reception, generation and distribution of data and/or instructions to, from and between RICP modules and/or allow further analysis of data generated during RICP operation. In some implementations, the RICP may be configured as an autonomous facility equipped with an RICP-specific controller that operates independently of the PPTC 110 or other Manager systems. In some implementations, the RICP and/or Manager may be a Manager Controller.

In one implementation, the Manager Controller 201 may be coupled to one or more interface components and/or functional modules. For example, the Manager Controller 201 may be coupled to a RIA Source Interface 205 configured to receive RIA source content, RIA instructions, and/or the like. The Manager Controller 201 may further be coupled to a User/Print Interface 210 configured to transmit an RICP UI to display print options and/or print product configurations to a user, receive print option specifications therefrom, provide print instructions and/or printable content for display and/or printing on a local and/or enterprise printer, and/or the like. The Manager Controller 201 may further be coupled to a PPTC interface 215 configured to relay printable content, instructions, metadata, and/or the like to the PPTC 110 for subsequent routing to one or more printers and/or PSPs. In one implementation, print job metadata may be configured in a job definition format (JDF), an example of which is provided here:

```
<?xml version="1.0" encoding="UTF-8"?>
<JDF Activation="Active" DescriptiveName="Single
Sheet Color Product / Flyer Small"
ICSVersions="Base_L1-1.3 CusMIS_L1-1.3" ID="P1"
JobPartID="P1" Status="Waiting"
xmlns:xsi="http://www.w3.org/2001/XMLSchema-instance"
xsi:type="Product"
Type="Product" Version="1.3" xmlns="http://www.CIP4.org/
JDFSchema_1_1">
    <AuditPool>
        <Created Author="Doug Belkofer"
        TimeStamp="2008-12-16T10:46:56-
05:00"/>
    </AuditPool>
    <ResourceLinkPool>
        <ComponentLink rRef="Link001" Usage="Output" Amount="250"/>
        <ArtDeliveryIntentLink rRef="Link002" Usage="Input"/>
        <LayoutIntentLink rRef="Link003" Usage="Input"/>
        <ColorIntentLink rRef="Link004" Usage="Input"/>
        <MediaIntentLink rRef="Link005" Usage="Input"/>
        <LaminatingIntentLink rRef="Link006" Usage="Input"/>
        <ShapeCuttingIntentLink rRef="Link007" Usage="Input"/>
        <PackingIntentLink rRef="Link008" Usage="Input"/>
    </ResourceLinkPool>
    <ResourcePool>
        <Component Class="Quantity" ComponentType="FinalProduct"
DescriptiveName="Small Color Flyer" Dimensions="396 612 0"
ID="Link001"
Status="Unavailable"/>
        <ArtDeliveryIntent ID="Link002" Class="Intent" Status="Available">
            <ArtDelivery ArtDeliveryType="DigitalFile">
                <RunListRef rRef="Ref006"/>
            </ArtDelivery>
        </ArtDeliveryIntent>
        <RunList ID="Ref006" Class="Parameter" Pages="0 ~ 1"
Status="Available">
            <LayoutElement>
                <FileSpec URL="Product1.pdf"/>
            </LayoutElement>
        </RunList>
        <LayoutIntent Class="Intent" ID="Link003"
Sides="TwoSidedHeadToHead"
Status="Available">
            <Dimensions DataType="XYPairSpan" Preferred="396 612"/>
            <Pages DataType="IntegerSpan" Preferred="2"/>
        </LayoutIntent>
        <ColorIntent ID="Link004" Class="Intent" Status="Available">
            <ColorStandard DataType="NameSpan" Preferred="CMYK"/>
        </ColorIntent>
        <MediaIntent ID="Link005" Class="Intent" Status="Available"
DescriptiveName="Premium Plus White Glossy 100# Text">
            <Grade DataType="IntegerSpan" Preferred="1"/>
            <MediaType DataType="EnumerationSpan" Preferred="Paper"/>
            <Weight DataType="NumberSpan" Preferred="135"/>
            <FrontCoatings DataType="EnumerationSpan"
Preferred="Glossy"/>
            <BackCoatings DataType="EnumerationSpan"
Preferred="Glossy"/>
            <MediaColor DataType="EnumerationSpan" Preferred="White"/>
            <StockBrand DataType="StringSpan" Preferred="HP"/>
            <StockType DataType="NameSpan" Preferred="Text"/>
        </MediaIntent>
        <LaminatingIntent ID="Link006" Class="Intent" Status="Available">
            <Laminated DataType="OptionSpan" Preferred="true"/>
            <Surface DataType="EnumerationSpan" Preferred="Both"/>
            <Thickness DataType="NumberSpan" Preferred="127"/>
        </LaminatingIntent>
        <ShapeCuttingIntent ID="Link007" Class="Intent"
Status="Available">
            <ShapeCut CutBox="0 0 396 612" Pages="0">
                <CutType DataType="EnumerationSpan" Preferred="Cut"/>
                <ShapeType DataType="EnumerationSpan"
Preferred="RoundedRectangle"/>
            </ShapeCut>
        </ShapeCuttingIntent>
        <PackingIntent ID="Link008" Class="Intent" Status="Available">
            <CartonQuantity DataType="IntegerSpan" Preferred="250"/>
            <WrappedQuantity DataType="IntegerSpan" Preferred="250"/>
            <WrappingMaterial DataType="NameSpan"
Preferred="Shrinkwrap"/>
        </PackingIntent>
    </ResourcePool>
</JDF>
```

In one implementation, the Manager Controller 201 may further be coupled to a content capture module 220 configured to read, process, and/or store media content relayed from the RIA Source Interface 205, such as may be provided on one or more RIA websites. In one implementation, the content capture module 220 may engage, inherit, and/or generalize RIA language printing code paths to capture RIA media content and package it with additional instructions, metadata, formatting, redirection, and/or the like suitable for printing the content with specified features, detail, and/or the like to one or more local, enterprise, PSP, and/or the like printers. For example, the Adobe Flash/Flex platform provides facilities allowing a developer to use an instance of a PrintJob class, to start( ), then to use addObject( ) one or more times, and finally to employ send( ) to pass output to the OS for local printing. The content capture module 220 may generalize the PrintJob class to create a subclass inheriting the interface and capabilities from PrintJob but adding additional interface components and data structure relationships to retrieve formatting and redirection information from the user and/or user system for output to one or more printing systems, PSPs, and/or the like.

In one implementation, implementation of RICP functionality may be implemented based on a form similar to the following example:

```
package mimeo.mimeoprint
{
    import com.adobe.net.URI;
    import flash.display.Sprite;
    import flash.events.Event;
    import flash.geom.Rectangle;
    import flash.net.URLLoader;
    import flash.net.URLRequest;
    import flash.net.URLRequestHeader;
    import flash.net.URLRequestMethod;
    import flash.printing.PrintJob;
    import flash.printing.PrintJobOptions;
    import org.alivepdf.layout.*;
    import org.alivepdf.saving.*;
    public class MimeoPrintJob extends PrintJob
    {
        private var _printToNet:Boolean = false;
        private var _pdf:PDF;
```

-continued

```
    private var _loader:URLLoader;
    private var _basePath:String;
    private var _serviceUri:URI;
    private var _serviceMetaData:XML;
    private var _serviceRedirectUrl:String;
    namespace xmlns_html = "http://www.w3.org/1999/xhtml";
    public function MimeoPrintJob( )
    {
        super( );
    }
    public override function addPage(sprite:Sprite,
        printArea:Rectangle=null,
options:PrintJobOptions=null, frameNum:int=0):void
    {
        if(this._printToNet)
        {
        }
        else
        {
            super.addPage(sprite, printArea, options, frameNum);
        }
    }
    public override function send( ):void
    {
        if(this._printToNet)
        {
        }
        else
        {
            super.send( );
        }
    }
    public override function start( ):Boolean
    {
        if(this._printToNet)
        {
            return true;
        }
        else
        {
            return super.start( );
        }
    }
    public function get PrintToNet( ):Boolean
    {
    }
    public function set PrintToNet(value:Boolean):void
    {
    }
    public function get BasePath( ):String
    {
    }
    public function set BasePath(value:String):void
    {
    public function get serviceUri( ):URI
    {
    }
    public function set serviceUri(value:URI):void
    {
    }
    public function get serviceMetaData( ):XML
    {
    }
    public function set serviceMetaData(value:XML)
    {
    }
    public function get serviceRedirectUrl( ):String
    {
    }
    public function set serviceRedirectUrl(value:String):void
    {
    private function _onUploadComplete(e:Event):void
    {
    }
  }
}
```

In the above example, a web service address for a print provider may be mediated by the phrase public function set serviceUri( ):URI; a web service specific order and document configuration data for the print provider may be mediated by the phrase public function set serviceMetaData( ):XML; and the print provider destination for completing a transaction may be mediated by the phrase public function get serviceRedirectUrl( ):String. It should be noted that, in some implementations, some or all components of the RICP may be configured as library functions that can be compiled into the RIA.

In one implementation, the Manager Controller 201 may further be coupled to a PDL formatting module 225 configured to process captured media content into one or more PDL formats such as, but not limited to, PDF, XPS, PostScript, Printer Command Language (PCL), Device Independent (DVI) format, PNG, JPEG, GIF, TIFF, XSLFO, HTML, and/or the like.

In one implementation, the Manager Controller 201 may further be coupled to a Routing Module 230 configured to direct processed media content to either a user's local and/or enterprise printer, PSP and/or the cloud via the user/print interface 210 or to the PPTC 110 via the PPTC interface 215 in order to be intelligently routed to one or more print facilities thereby.

In one implementation, the Manager controller 201 may further be coupled to plurality of databases configured to store and maintain Manager data. A PDL profiles database 235 may contain PDL specifications associated with any of a variety of PDL and/or page description markup languages. A RIA profiles database 240 may contain RIA language specifications, code paths, application programming interface (API) tools, and/or the like associated with a wide variety of RIA languages and resources. The RIA profiles database 240 may further contain specific profiles and/or information directed to particular RIA media sources, websites, and/or the like.

Figure 3:
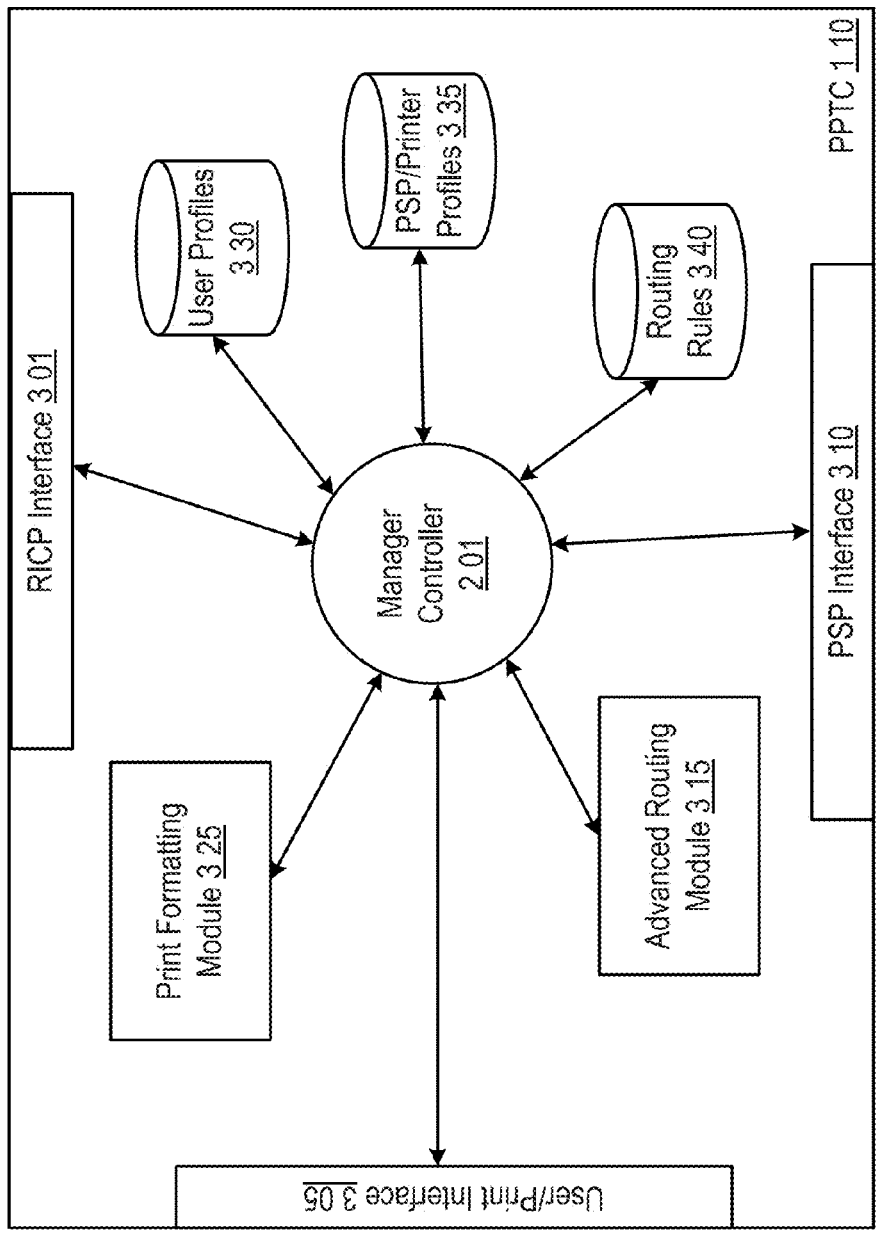
FIG. 3 shows aspects of PPTC system components in one embodiment of Manager operation.

FIG. 3 shows aspects of PPTC system components in one embodiment of Manager operation. The PPTC 110 may contain a number of functional and/or computational modules and/or data stores. A Manager controller 201 may serve a central role in some embodiments of Manager operation, serving to orchestrate the reception, generation and distribution of data and/or instructions to, from and between PPTC modules and/or allow further analysis of data generated during PPTC operation. In some implementations, the PPTC may be configured as an autonomous facility equipped with an PPTC-specific controller that operates independently of the RICP 105 or other Manager systems. In some implementations, the PPTC and/or Manager may be a Manager Controller.

In one implementation, the Manager Controller 201 may be coupled to one or more interface components and/or functional modules. For example, the Manager Controller 201 may be coupled to a RICP Interface 301 configured to receive printable content from the RICP, instructions, metadata, and/or the like information and/or instructions for routing delivered content to one or more printers and/or PSPs. The Manager Controller 201 may further be coupled to a User/Print Interface 305 configured to receive print content, metadata, instructions and/or the like from an individual and/or enterprise user system and/or to provide print instructions to one or more user and/or enterprise printers, enterprise reproduction departments, and/or the like. The Manager Controller 201 may further be coupled to a PSP Interface 310 configured to communicate with one or more PSPs and to provide printable content thereto, along with metadata, instructions, and/or the like to enable PSPs and/or PSP printers to print provided content according to desired specifications.

In one implementation, document metadata may take a form similar to the following XML example:

<Data i:type="a:Document" version="3.0" type="BoundDocument" size="Letter" xmlns:a="http://schemas.mimeo.com/dom/3.0/Document.xsd" xmlns:is ="http://schemas.mimeo.com/dom/3.0/ImpressionSources.xsd" xmlns:cnfg="http://schemas.mimeo.com/dom/3.0/Configurations.xsd">

In one implementation, the Manager Controller 201 may further be coupled to an Advanced Routing Module 315 configured to analyze received printable content, print instructions, metadata, and/or the like as well as printer and/or PSP capabilities, to determine appropriate print solutions for a given print job, to pass printable content to selected print devices and/or PSPs, and/or the like. In one implementation, printer and/or PSP capabilities may be saved in association with a user, printer, and/or PSP profile and/or provided to the Manager by one or more utility applications, such as but not limited to Hewlett Packard's Webjet Admin. Further details regarding print traffic routing by the Advanced Routing Module 315 are provided below.

In one implementation, the Manager Controller 201 may further be coupled to a Print Formatting Module 325 configured to process printable content into one or more formats suitable for printing by printers and/or PSPs selected by the Advanced Routing Module 315. In one implementation, the Print Formatting Module 325 may be configured to process printable content into any of a variety of PDL formats. In one implementation, the Print Formatting Module 325 may attach special and/or customized instructions, metadata, and/or the like to printable content destined for particular PSPs, printers, and/or the like print destinations.

In one implementation, the Manager controller 201 may further be coupled to plurality of databases configured to store and maintain Manager data. A User Profiles database 330 may include profile information related to individual and/or enterprise users, such as print preferences, print histories, contact information, and/or the like. In some implementations, the Advanced Routing Module 315 may call data from the User Profiles database 330 in deciding where a particular print job should be routed. A PSP/Printer Profiles database 335 may include profile information related to PSPs, printers, print systems, enterprise print departments, and/or the like, including information describing the printing capabilities, limitations, restrictions, and/or the like associated with these various print destinations as well as print formatting requirements for print jobs sent to the various destinations. In one implementation, the Advanced Routing Module 315 may call and/or analyze data from the PSP/Printer Profiles database 335 to assist in determining the suitability of particular print destinations for a given print job or class of print jobs. In one implementation, the Print Formatting Module 325 may call data from the PSP/Printer Profiles database 335 to determine how particular print jobs should be formatted. A Routing Rules database 340 may include a plurality of rules, such as may be embodied in an XML format, defining relationships between print destinations, including print destination capabilities, and print job characteristics, such as content, source, instructions, preferences, metadata, specified destination, requested delivery time, and/or the like. In one implementation, the Advanced Routing Module 315 may call rules from the Routing Rules database 340 to determine how a given print job or class of print jobs should be routed. In an alternative implementation, the Advanced Routing Module 315 may itself contain some or all of the routing rules. In one implementation, some or all rules contained in the Routing Rules database may be specific to particular users, user profiles, and/or the like.

Figure 4:
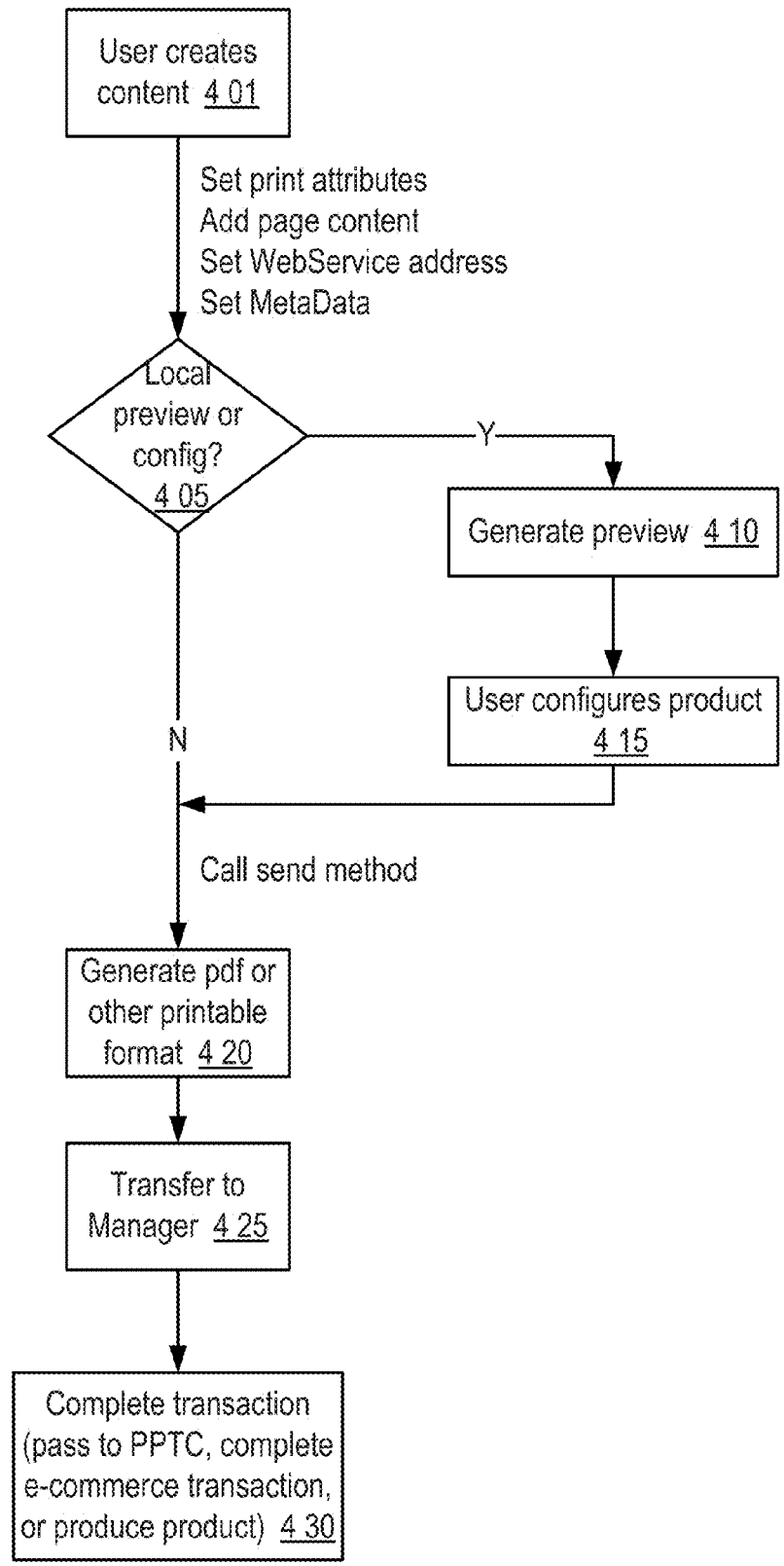
FIG. 4 shows aspects of an implementation of logic flow for an end-to-end print transaction based on user-generated content in one embodiment of Manager operation.

FIG. 4 shows aspects of an implementation of logic flow for an end-to-end print transaction based on user-generated content in one embodiment of Manager operation. A user may engage a computer system to create content, such as by the use of local client software, network software, interactions with the world wide web, and/or the like 401. In one implementation, the user may create printable content by engaging RICP functionality, as described below, to capture RIA media content from one or more RIA sources, websites, and/or the like. Upon indicating a desire to print the content in accordance with Manager facilities, print attributes may be set, page content may be added, a web service address specified, and metadata included to initiate the print process. A determination may be made as to whether a local (e.g., client-side) preview and/or configuration of the print job is desired 405. If so, then a preview is generated for display to the user 410, and the user is permitted to configure the print product 415. For example, the user may be provided with a graphical user interface (GUI) providing a display of the preview version of the print product, which may change in real time as the user manipulates GUI elements to adjust print product specifications, attributes, metadata, and/or the like, such as but not limited to margins, color, size, dimensions, aspect ratio, binding, orientation, ink type, printer type, watermarks, and/or the like. A PDF or other printable format, PDL format, and/or the like may then be generated based on the content, attributes, metadata, and/or the like and transferred to the Manager 425. In an alternative implementation, the raw content data may be transferred to the Manager and converted thereby into one or more PDL formats. The print transaction is then completed 430, whereby the Manager Controller passes the print job to the PPTC for routing to one or more print destinations, completion of an e-commerce transaction, direct production of the requested print product, and/or the like.

Figure 5:
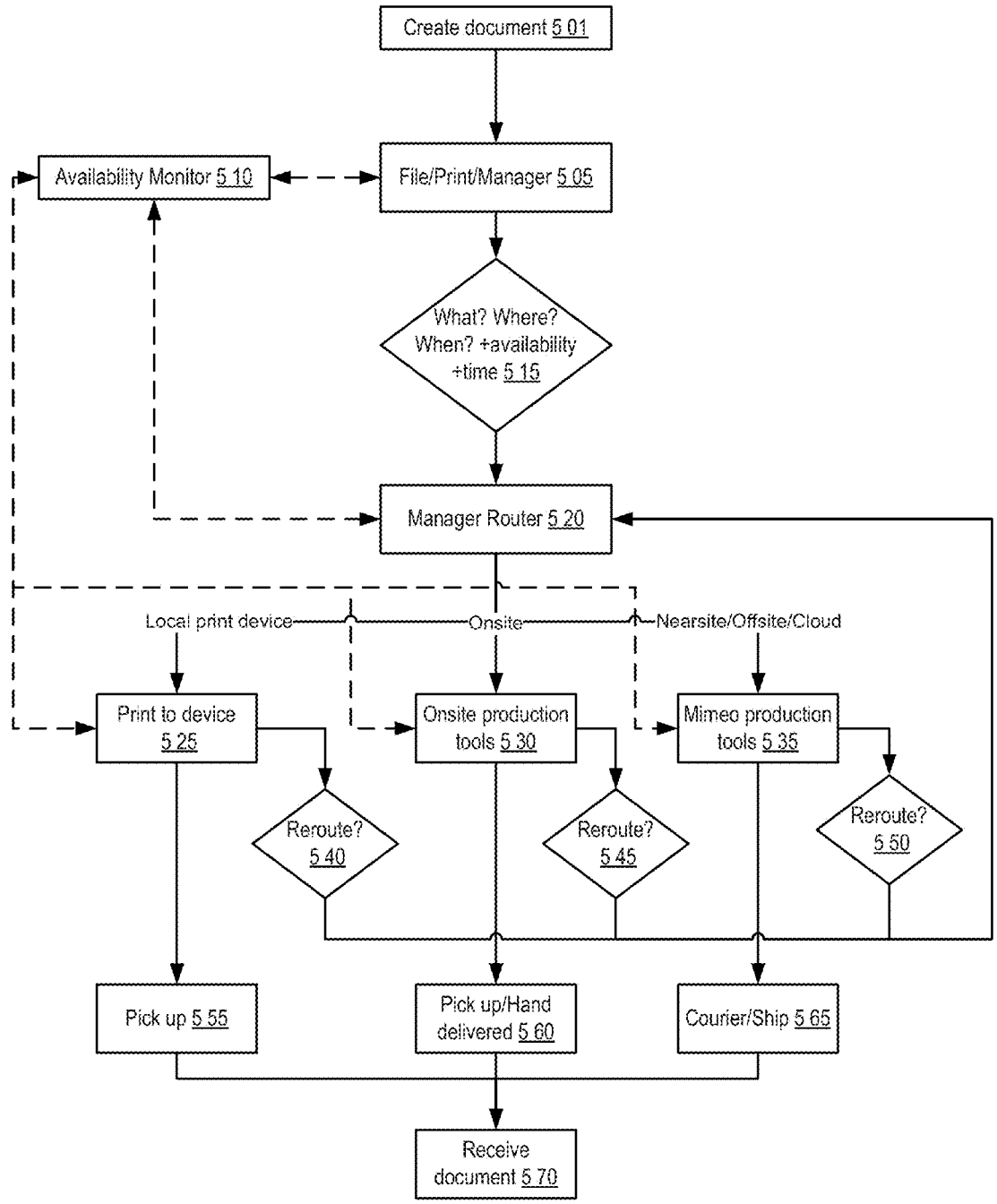
FIG. 5 shows aspects of an implementation of logic flow for an end-to-end print transaction in another embodiment of Manager operation.

FIG. 5 shows aspects of an implementation of logic flow for an end-to-end print transaction in another embodiment of Manager operation. A document is created at 501. A wide variety of documents may be compatible with Manager operation. In one embodiment, any document that may be printed to an ordinary printer may be processed by the Manager. A determination may then be made as to whether to file (e.g., save) the document, print the document directly to a selected printing device or agency, or to pass the document to the Manager for routing to an appropriate printing method 505. An availability monitor 510 may be queried to determine whether a selected document action is available (i.e., whether a selected local printer is on line, in user, out of toner, and/or the like). If the document is directed to the Manager, the document's reproduction specifications, reproduction and/or delivery locations, scheduling, reproduction availability, and/or the like may be queried and/or determined 515, and the document passed to a Manager router 520. In one implementation, the document is analyzed by the Manager at 515 to determine a document classification based on which a particular reproduction method and/or destination may be assigned. For example, a document may be analyzed to determine a total length, and documents shorter than a specific length may be sent for printing to a local printer while those longer than a specific length may be relayed to an enterprise reproduction facility and/or agency. The Manager may further consider user-supplied restrictions, requests, special handling instructions, and/or the like in determining the appropriate document destination. For example, a user may be allowed to request that the document be reproduced as a bound copy, in which case the Manager may direct the document to an in-house and/or external document reproduction agency suited to produce the document in the requested bound form. In one implementation, the Manager router 520 may perform the aforementioned document analysis.

Once a reproduction method and/or destination has been determined and/or established, the Manager router 520 may direct the document to an appropriate destination for reproduction. In one implementation, the router's direction to a reproduction destination may be subject to and/or delayed by availability 510. A variety of different reproduction methods, printers, reproduction services and/or agencies, and/or the like may act as reproduction destinations, such as but not limited to: device printing 525, onsite production tools (e.g., an enterprise word processing and/or reproduction department) 530, Manager and/or third party reproduction tools or services (e.g., an offsite reproduction agency, a print facility in the cloud) 535, and/or the like. Any or all reproduction destinations may, in various implementations, be subject to availability 510, and rerouting (540, 545, 550) between and/or among reproduction destinations may occur. In one implementation, several possible and/or allowable reproduction destinations may be established and/or determined by the Manager. In a further implementation, a plurality of possible and/or allowable reproduction destinations may be ordinaly ranked and/or otherwise prioritized, such as may be based on document characteristics and/or a document classification. The reproduced and/or printed document(s) may be retrieved in a manner based on the selected document reproduction method and/or destination. For example, documents printed to a local device 525 may be picked up 555, documents reproduced by onsite production tools 530 may be picked up or hand delivered 560, and documents reproduced by Manager and/or third party production tools 535 may be delivered by courier, shipment, postal mail, and/or the like. Finally, reproduced documents are received at 570.

Figure 6:
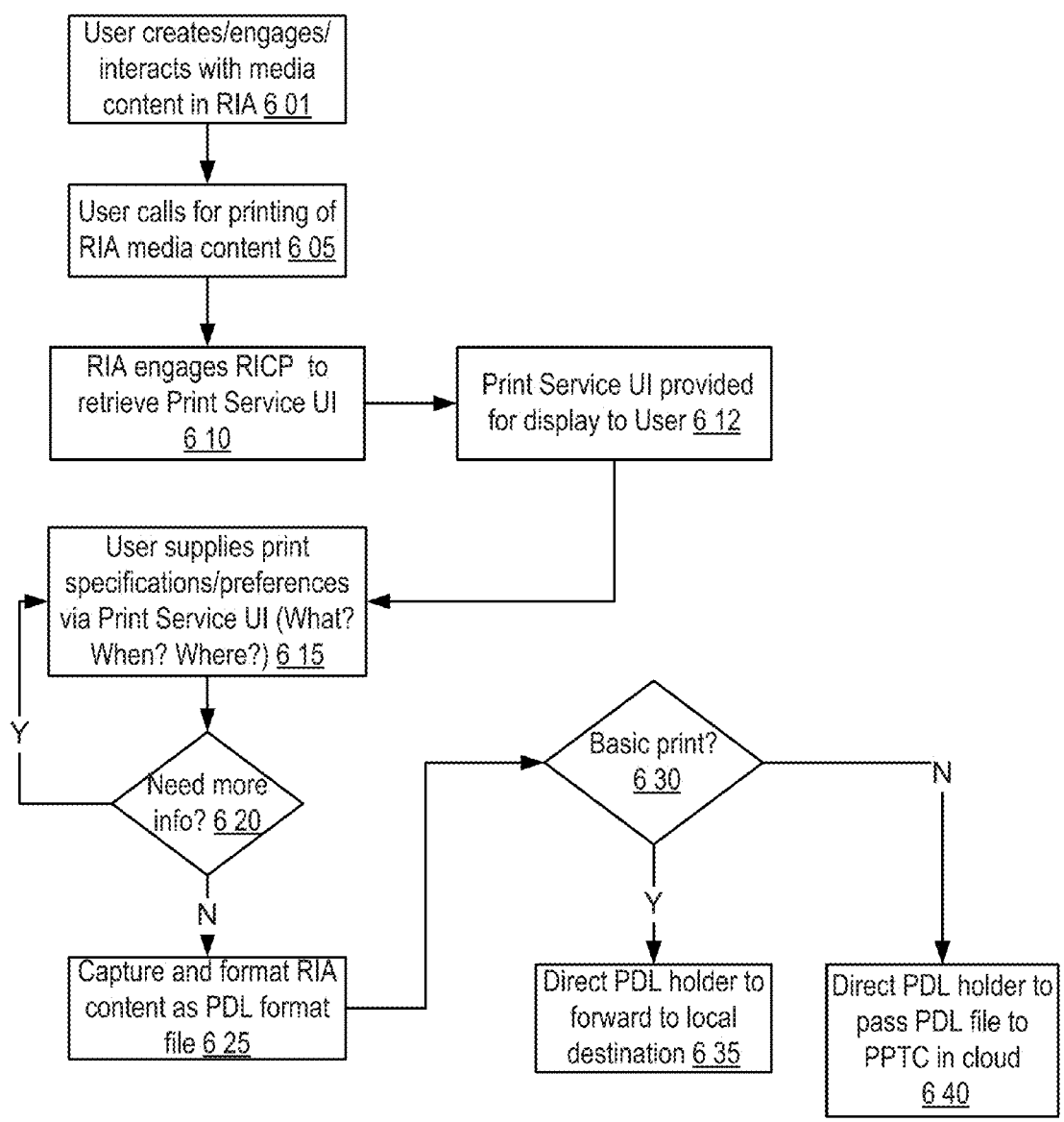
FIG. 6 shows aspects of an implementation of logic flow for RIA content processing in one embodiment of Manager operation.

FIG. 6 shows aspects of an implementation of logic flow for RIA content processing and/or RICP instrumentality in one embodiment of Manager operation. A user creates, engages, interacts with, and/or the like media content supplied by an RIA source over a network connection via a client-side computer system 601. The user may then indicate the desire for Manager-enabled printing of RIA media content, such as by selecting a print function from a user interface, selecting a Manager-associated print driver, and/or the like 605. In the illustrated implementation, the RIA source may directly engage the Manager and/or RICP subsystems to retrieve a print service UI 610. In one implementation, the print service UI may be retrieved over a network connection, on the internet, in the "cloud", and/or the like while, in an alternative implementation, the print service UI may be retrieved from a local source. In an alternative implementation, the user's client-side computer may engage and/or interface with the RICP. In still another implementation, elements of the RICP may be stored and/or run locally on the client-side computer to provide RICP functionality to the user. The RICP instrumentality may generate a Print Service UI to be provided to the user 612, allowing the user to supply print specifications, preferences, metadata, and/or the like, such as but not limited to what content the user is seeking to print, when the user requires the print product to be generated and/or delivered, where the user would like the print product generated and/or delivered, and/or the like 615. A determination may be made as to whether the Manager requires additional information to be supplied by the user 620. If so, the user is prompted accordingly via the Print Service UI 615. Otherwise, the RIA content may be captured by the Manager and/or RICP and/or converted into one or more PDL formats 625. A determination may then be made as to whether the captured and/or converted content should be subjected to a basic print or a more advanced routing 630. If a basic print is desired, the Manager may pass the PDL file to a specified PDL enabled printer, such as a local client-side printer, enterprise printer, and/or the like, and/or may direct a PDL holder to pass the PDL file to a specified PDL enabled printer 635. Alternatively, the Manager may provide and/or direct a PDL holder to provide the PDL file to the PPTC, which may also be configured as a Manager subsystem and/or be separated from the RICP in the cloud, for intelligent routing to an appropriate print destination, PSP, and/or the like 640.

Figure 7A:
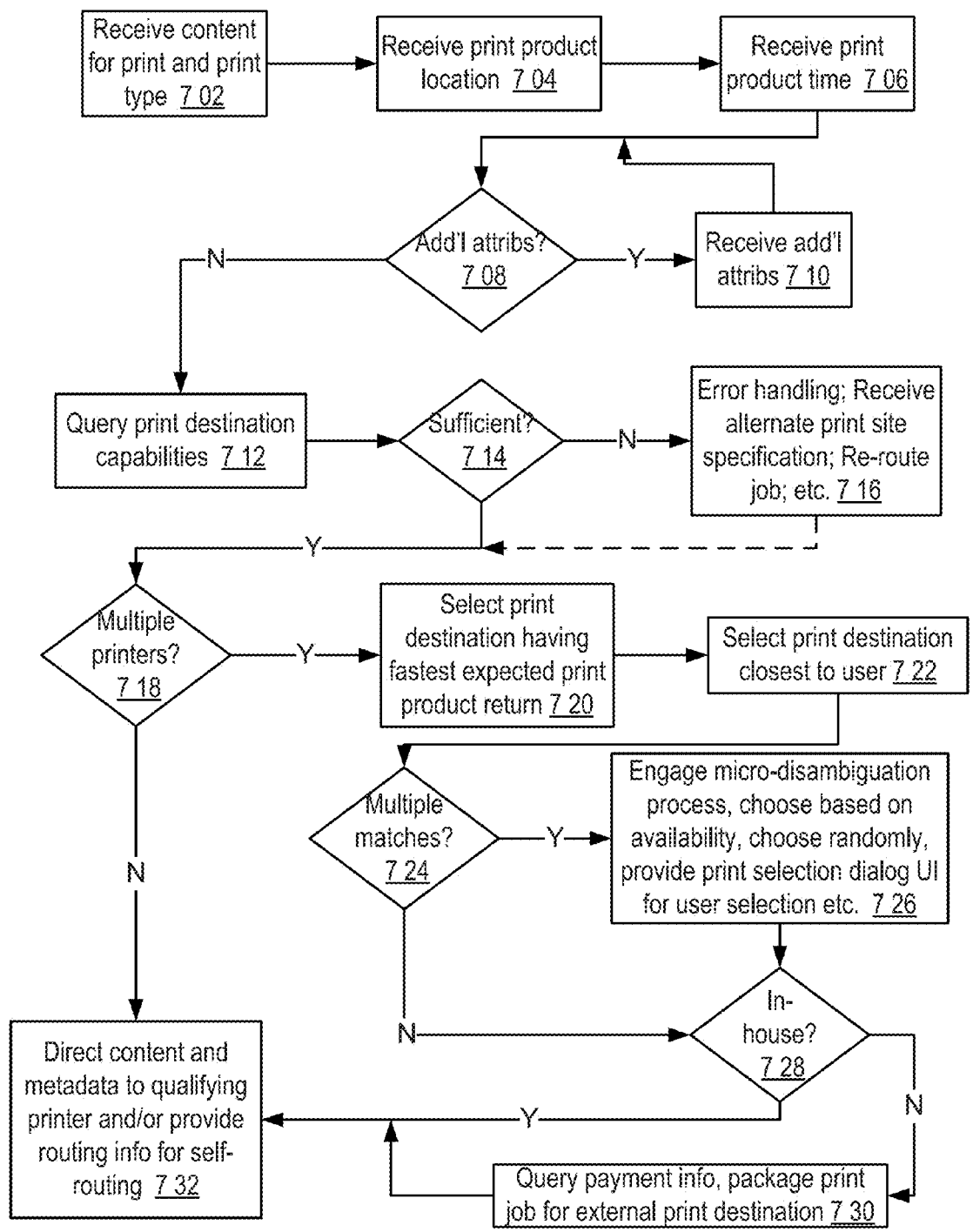
FIG. 7A shows aspects of an implementation of logic flow for PPTC print job routing in one embodiment of Manager operation.

FIG. 7A shows aspects of an implementation of logic flow for PPTC print job routing in one embodiment of Manager operation. Print content and a print type, print job type, and/or the like specifications may be received 702, together with a print product location 704 and a print product time 706. In one implementation, a print product location comprises a desired location to which a print product should be delivered (e.g., a postal address). In an alternative implementation, a print product location comprises a desired location or set of locations at which a print product should be generated (e.g., a specific PSP, a set of printers, a class of printer types, and/or the like). In one implementation, a print product time specifies a desired delivery date and/or time for requested print product. A determination may be made as to whether additional attributes, print specifications, metadata, and/or the like should be or are desired to be included 708. If so, then the additional attributes are received 710, such as via a print service GUI provided to the user. Additional attributes may include a wide variety of print job specifications, such as but not limited to margins, color, size, dimensions, aspect ratio, binding, orientation, ink type, printer type, watermarks, and/or the like. The Manager and/or PPTC subsystem may then query print site capabilities 712, such as may be associated with print product locations provided at 704, print destinations, print resources, and/or the like. In one implementation, print resources may be supplied by resource tools, such as HP Webjet Admin. In another implementation, print resources may be provided by print resource administrators, PSP systems, and/or the like. A determination may be made as to whether selected print sites have sufficient capabilities to meet the requirements or desired print features provided by the user and/or associated with the print job 714. For example, the Manager may analyze print content to determine if a given printer, PSP, and/or the like is suited and/or capable to handle the print job. If, for example, the number of pages, print quality, color, size, and/or the like are beyond the capabilities of a given printer, PSP, and/or the like, or even if they are within the capabilities but the print job is nevertheless handled more effectively, quickly, cheaply, and/or the like by a different printer, PSP, and/or the like, then the inadequate print destination may be disregarded, an error handling process undertaken, new print site specification requested, and/or the like and the print job routed to a print destination suited to best handle the print job 716. Further details of one implementation of error handling are provided below with reference to FIG. 7C.

A determination may be made as to whether there are multiple print destinations suited to handle the print job 718. If not, then the print job, including content, attributes, metadata, and/or the like is routed to the single qualifying printer, PSP, and/or the like print destination and/or print routing information may be provided directly to a user, Manager administrator, enterprise administrator, and/or the like for manual and/or self-routing 732. In one implementation, print routing information and/or print product delivery may be communicated to a user, such as via a twitter, short message service (SMS), simple mail transfer protocol (SMTP), and/or the like. Otherwise, the Manager may determine print destinations having capabilities best suited to the content and/or metadata requirements associated with the print job. This determination may be made based on a plurality of rules associating printers, printer types, PSPs, and/or the like with print job characteristics. For example, a PSP specializing in commercial-scale, high-quality calendar printing may be listed in the rules for print jobs discerned to fall into its area of expertise, such that a print job requiring color printing on glossy paper of 1,000 copies of a collection of 12 photos, each copy to be configured as a bound calendar, may be routed thereto. Rules may further take into account the characteristics of the user requesting the print job, user profiles, preferences, and/or the like. In the illustrated implementation, the Manager may select print destinations having the fastest expected print product return 720, such as may be based on a query of print capabilities and/or a determination based thereon. The Manager may then select a print destination that is closest to the user 722. A determination may be made as to whether there are still multiple print destinations matched to the print job 724. If so, the Manager may engage in a micro-disambiguation process, selecting from the remaining print destinations based on any of a variety of secondary criteria, such as but not limited to reliability, availability, cost, proximity, user selection from a print selection dialog UI, and/or the like 726. In one embodiment, the Manager can prioritize print jobs to resources that bid for print jobs based on cost, or any other factors. Bids may be provided by resources along with their availability, usage, and/or the like resource information. Further details surrounding provision of a print selection dialog UI are provided below with reference to FIG. 7B. Alternatively, the Manager may choose randomly from remaining print destinations. In another implementation, the Manager may retain multiple matching and/or qualifying print destinations and provide them all for display to and selection by a user and/or Manager administrator. In one implementation, multiple qualifying print destinations may be ranked and/or provided in ranked and/or categorized order for display to the user and/or Manager administrator. A determination may be made as to whether the selected print destination corresponds to an in-house printer (i.e., a printer local to the user and/or user system) 728. If not, then the Manager may query payment and/or authorization information, such as from a user profile, and prepare a print package suitable for transmission to the selected and/or qualifying print destination 730. The print job, including content and associated metadata, may then be routed to one or more selected and/or qualifying printers, PSPs, and/or the like print destinations 732. In one implementation, the Manager may refrain from providing the print content itself, but rather may only provide print routing information, attributes, metadata, and/or the like to configure a remote system to process and/or route content held by itself or by yet another system.

In one implementation, a print request order, such as may be routed to a qualifying PSP, may take a form similar to the following XML example:

```
<OrderRequest
xmlns="http://schemas.mimeo.com/EnterpriseServices/2008/09/
OrderService"
xmlns:i="http://www.w3.org/2001/XMLSchema-instance">
  <LineItems>
    <AddLineItemRequest>
```

-continued

```
      <Name>Presentation Text & Images</Name>
      <Data i:type="a:Document" version="3.0"
       type="BoundDocument" size="Letter"
       xmlns:a="http://schemas.mimeo.com/dom/3.0/Document.xsd"
       xmlns:is="http://schemas.mimeo.com/dom/3.0/Impression
       Sources.xsd" xmlns:cnfg="http://schemas.mimeo.com/dom/3.0/
       Configurations.xsd" >
        <StoreItemReference i:nil="true" />
        <Description>Test description 1</Description>
        <ReferenceData>Test Reference data 1</ReferenceData>
        <Quantity>1</Quantity>
    </AddLineItemRequest>
  </LineItems>
  <Recipients>
    <AddRecipientRequest>
      <Address>
        <AddressId>9b03e968-9afa-4cc4-ad61-9f089ebe6452</AddressId>
        <ReferenceData />
        <ShipmentNumber>0</ShipmentNumber>
        <ShippingMethodId>88ce7825-bdf5-43f4-9064-
         d5d9dadca0f0</ShippingMethodId>
    </AddRecipientRequest>
  </Recipients>
  <SpecialInstructionCodes
   xmlns:a="http://schemas.microsoft.com/2003/10/Serialization/Arrays" />
  <DiscountCodes
   xmlns:a="http://schemas.microsoft.com/2003/10/Serialization/Arrays" />
  <PaymentMethod i:type="CreditCardPaymentMethod">
    <NameOnCard />
    <CreditCardType>Visa</CreditCardType>
    <Number>4111111111111111</Number>
    <BillingPostalCode />
    <Street i:nil="true" />
    <ApartmentOrSuite>ApartmentOrSuite</ApartmentOrSuite>
    <City i:nil="true" />
    <StateOrProvince i:nil="true" />
    <CountryCode>US</CountryCode>
    <ExpirationMonth>8</ExpirationMonth>
    <ExpirationYear>2012</ExpirationYear>
    <UserCreditCardId>0bab7dd6-4dc3-4ad3-ae9b-
     fe358cc3a141</UserCreditCardId>
  </PaymentMethod>
  <ShipFromInfo>
    <FirstName>Jane</FirstName>
    <LastName>Doe</LastName>
    <Email>Jane_Doe@mimeo.com</Email>
    <CompanyName />
    <TelephoneNumber>555-555-1000</TelephoneNumber>
  </ShipFromInfo>
  <PackagingSlip>
    <SalutationType>None</SalutationType>
    <Memo i:nil="true" />
  </PackagingSlip>
  <ReferenceNumber>Test Reference</ReferenceNumber>
  <Options>
    <AdditionalProcessingHours>0</AdditionalProcessingHours>
    <TaxExemptStatusEnabled>true</TaxExemptStatusEnabled>
    <RecipientNotificationOptions>
      <IncludeSenderContactInformation>true
      </IncludeSenderContactInformation>
      <ShouldNotifyRecipients>true</ShouldNotifyRecipients>
    </RecipientNotificationOptions>
  </Options>
</OrderRequest>
```

Figure 7B:
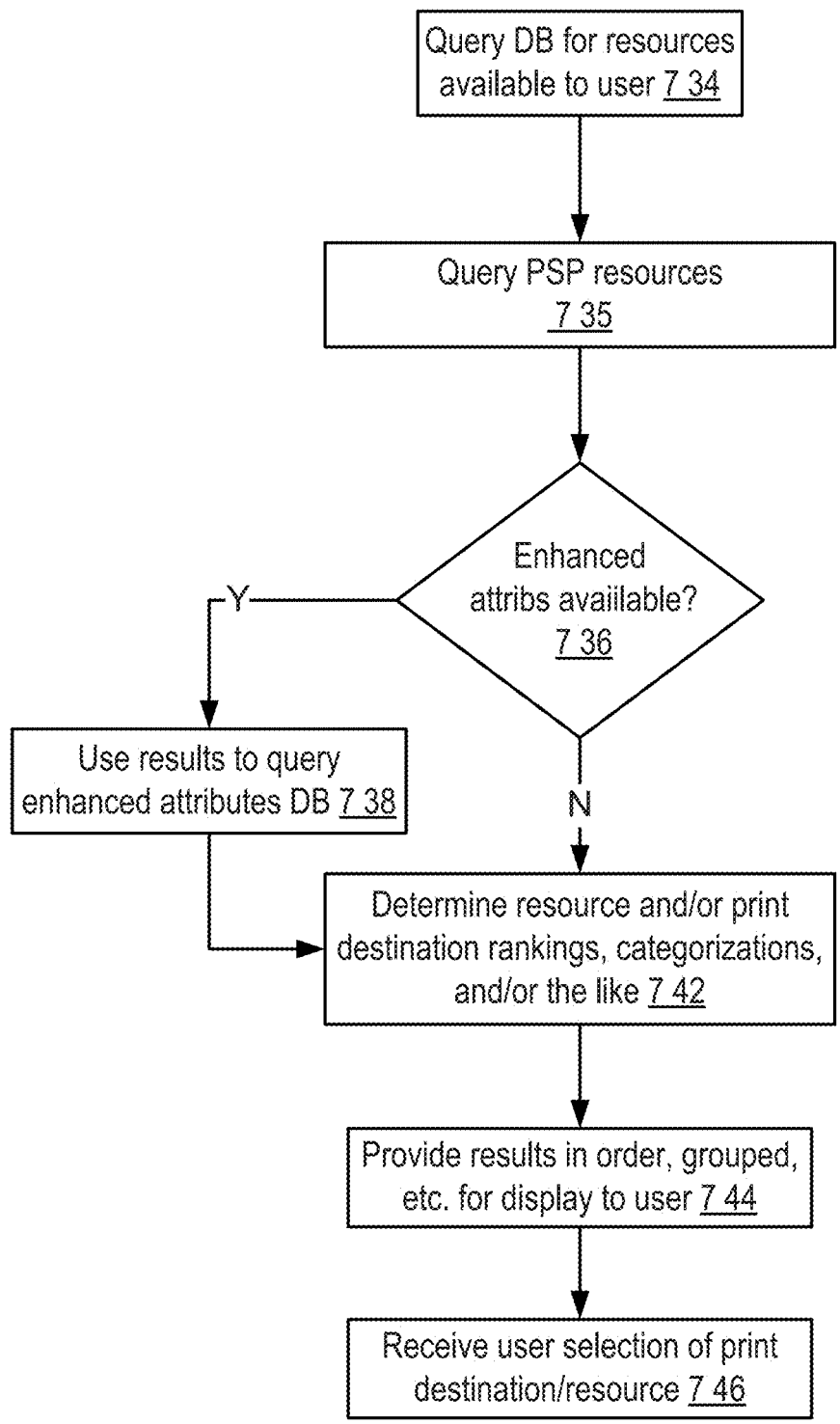
FIG. 7B shows an implementation of logic flow for provision of a print destination selection dialog UI in one embodiment of Manager operation.

FIG. 7B shows an implementation of logic flow for provision of a print destination selection dialog UI in one embodiment of Manager operation. The Manager may query a print resource database to determine which resources are available to a user, and/or to determine availability, capability, and/or the like of those resources 734. The Manager may further query available PSP resources 735. A determination may be made 736 as to whether enhanced attributes are available in association with the resources from 734 or 735. In one implementation, enhanced attributes may comprise specific information, selectable options, and/or the like associated with relationships between users and print resources, PSPs, and/or the like. For example, an enhanced attribute may indicate an additional print product delay of 1 hour for a user in relation to a PSP that is 1 hour away across time (i.e., the time it would take a courier to deliver a print product from that PSP). If enhanced attributes are available, they may be queried at 738. Based on local resources, PSP resources, and/or the like as well as enhanced attributes, if available, the Manager may determine print destination rankings, categorizations, and/or the like 742. For example, in one implementation, the Manager may rank candidate print destinations based on expected delivery time of print products. In another implementation, the Manager may group candidate print destinations in categories such as those shown in FIGS. 9A-9B (e.g., recommended, closest available, electronic, recent, etc.). Results may then be provided in order of ranking, grouped according to categorization, and/or the like for display to the user via a print selection dialog UI 744, and the user selection of one or more print destinations and/or resources received thereby 746.

Figure 7C:
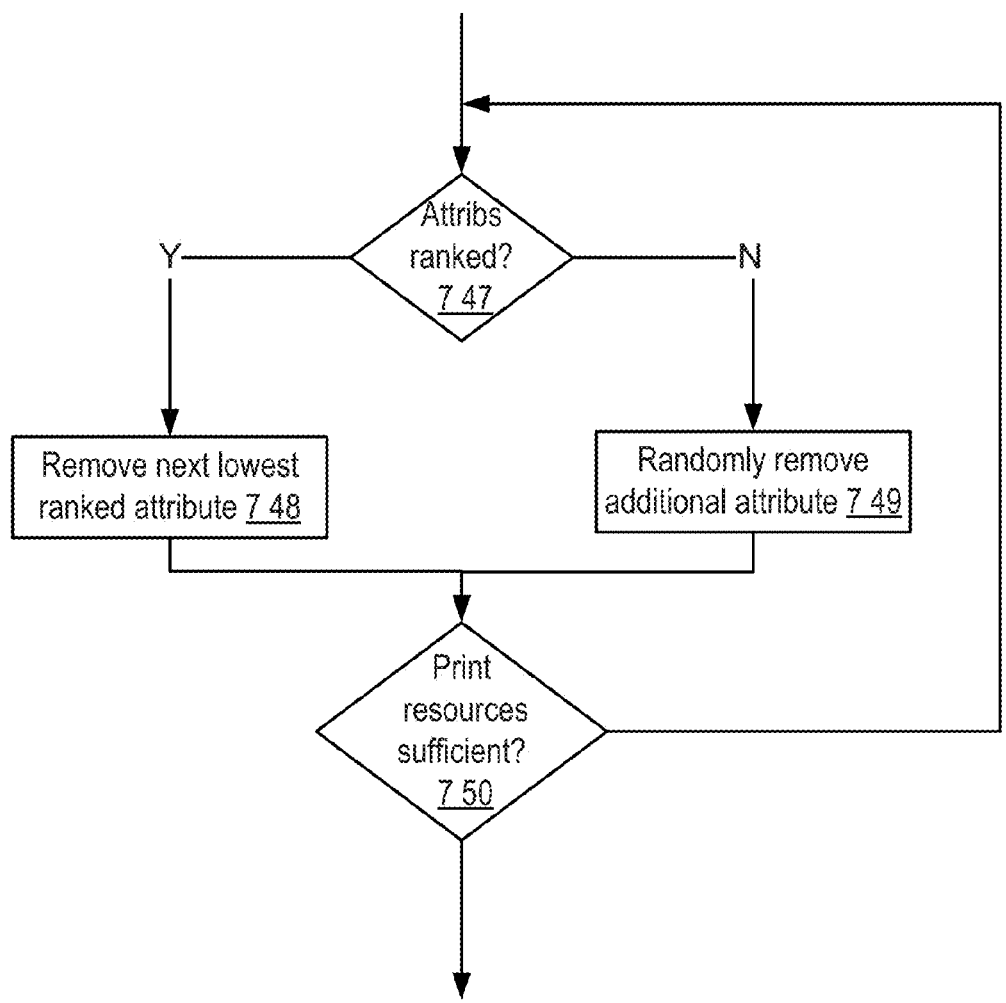
FIG. 7C shows an implementation of logic flow for error handling, fault tolerance, graceful degradation, and/or the like in one embodiment of Manager operation.

FIG. 7C shows an implementation of logic flow for error handling, fault tolerance, graceful degradation, and/or the like in one embodiment of Manager operation. If there are no or fewer than a minimal acceptable number of print destinations with sufficient capabilities to handle a given print job having associated attributes, a determination may be made as to whether the attributes are ranked 747. If so, then the Manager may remove the next lowest ranked attribute from consideration 748. Otherwise, the Manager may randomly remove one of the attributes associated with the print job 749. A determination may then be made as to whether removal of the attribute has resulted in one or more print resources, destinations, and/or the like having sufficient capabilities to handle the print job. If not, the process may return to 747 to attempt removal of further attributes. In one implementation, if more than a maximum number of attributes are removed, or if no further attributes are left to remove, the Manager may provide an error message.

Figure 7D:
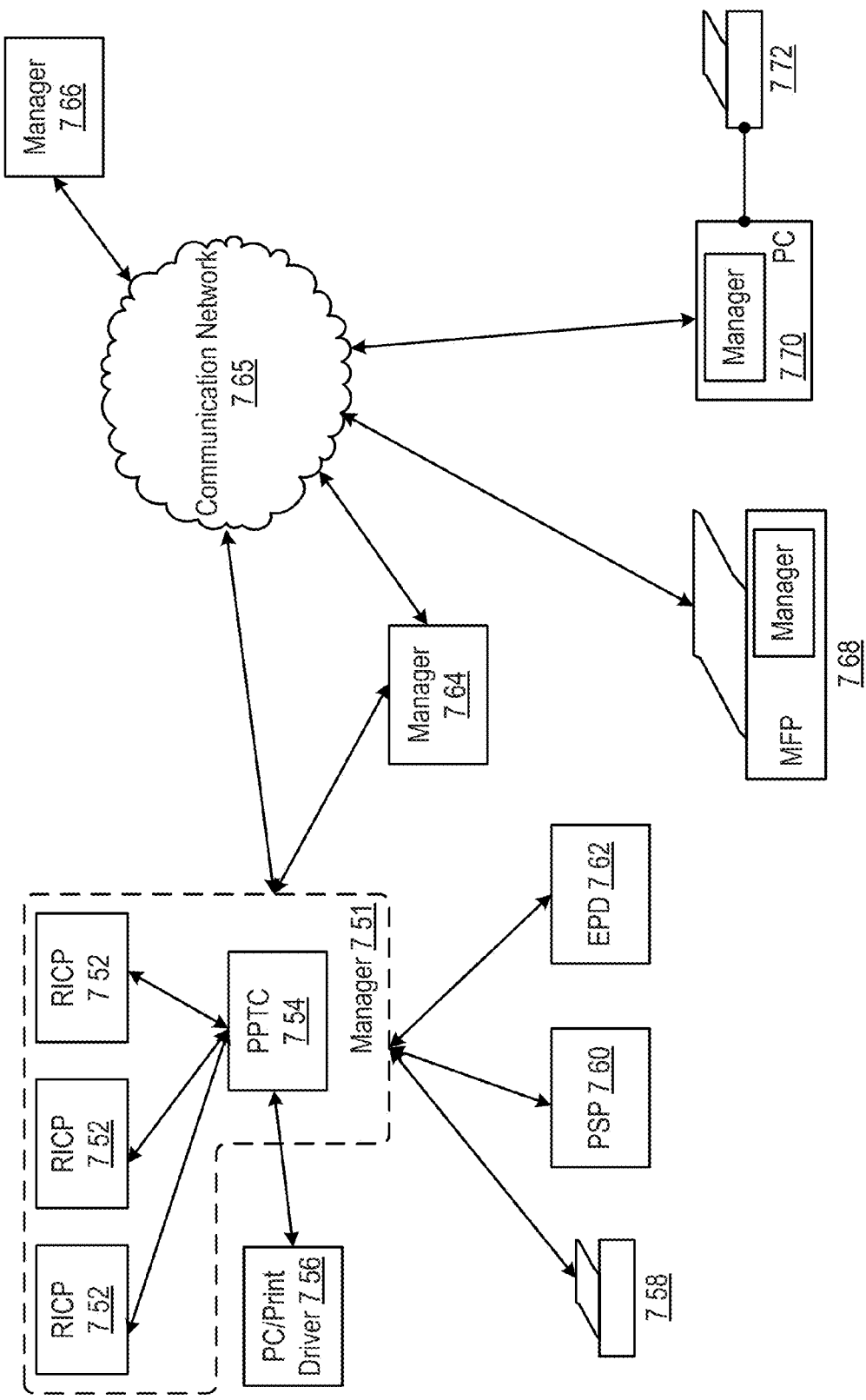
FIG. 7D shows an implementation of data flow between Manager systems and affiliated entities in one embodiment of Manager operation.

FIG. 7D shows an implementation of data flow between Manager systems and affiliated entities in one embodiment of Manager operation. A Manager system 751 may include RICP 752 and PPTC 754 components. The PPTC 754 may receive print instructions and/or a routing request from a variety of external entities, such as but not limited to a local personal computer (PC) having a print driver installed thereon 756 directing print requests to the PPTC 754 and/or Manager 751. Print jobs may be routed to a variety of external resources, entities, print destinations, and/or the like, such as but not limited to a printer device 758, PSPs 760, enterprise print departments 762, other Manager systems 764, the Cloud, communications network 765, and/or the like. Other Manager systems 766 may exist beyond the cloud 765 and communicate through it to print resources, other Managers, PSPs, printer devices, and/or the like. In one implementation, a print device, multifunction printer (MFP), and/or the like 768, such as the Cannon ImageRUNNER 7086, may be outfitted with Manager components, allowing it to route jobs to other print systems, such as may be based on its own resource usage and/or availability, and which may be undertaken in a peer-to-peer (P2P) framework. In one implementation, a printer device may register itself as a Manager network print destination and/or resource if capable of doing so, and/or may query its own resource usage, availability, queue length, print capabilities, and/or the like and, based thereon, engage Manager and/or PPTC components to re-route one or more print jobs to other systems. In one implementation, print resources, printer devices, PSPs, and/or the like equipped with Manager components and/or engaged within a Manager resource network may bid for print jobs, such as by providing a price quote in response to a print job request query. Manager components may also be incorporated on PC systems 770 connected locally and directly to print devices 772.

Figure 8A:
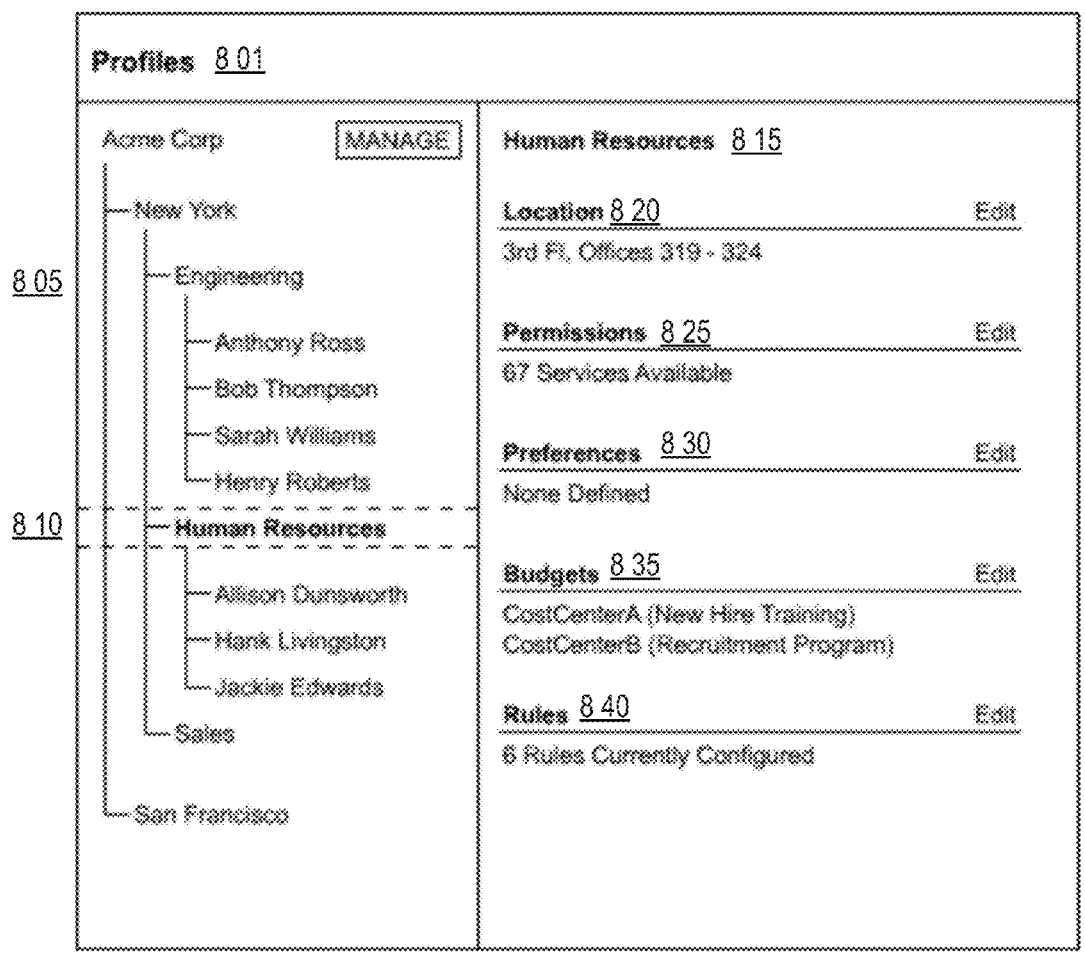
FIG. 8A shows aspects of an implementation of a user profile in one embodiment of Manager operation.

FIG. 8A shows aspects of an implementation of a user profile in one embodiment of Manager operation. The illustrated implementation of a user profile 801 includes a hierarchical tree structure 805 related to Acme Corp. The tree includes regional branches (e.g., New York, San Fransisco), followed by divisional branches (e.g., Engineering, Human Resources, Sales), and lastly by individual branches associated with employees. In one implementation, user profiles may be associated with any hierarchical level of such a tree. For example, in the illustrated implementation, the Human Resources branch 810 has an associated profile indicated at 815. The profile 815 associated with Human Resources includes location information 820, permissions 825, preferences 830, budgets 835, and rules 840 associated thereto. In one implementation, locations 820 may include delivery locations for requested print jobs, a listing of which may be provided to the user as part of a print service UI in order to allow the user to specify which of the locations he or she wishes a particular print job to be delivered to. In one implementation, the profile UI 801 may be implemented as a web application run remotely and/or in the cloud while, in another implementation, the UI may run locally, such as based on client-side application software.

FIG. 8B shows aspects of an implementation of a PSP profile in one embodiment of Manager operation. Provider profiles 845 may, in one implementation, be organized into a tree-structured hierarchy 848, with various levels of detail associated with each of a plurality of PSPs. In the illustrated implementation, a PSP-level profile associated with Mimeo.com 850 is selected, with the profile shown at 852. The profile includes a name and url associated with the PSP 855; a display name 858; products 860, such as print job packages, products, capabilities, and/or the like provided by the PSP; locations 865; cutoffs and service level agreements (SLAs) 870; rules associated with and/or otherwise connected to the PSP 875; and one or more service configuration links 880. In one implementation, cutoffs and SLAs 870 may be provided for each PSP, comprising rules that specify when a print job must be received in order to produce the corresponding print product by a specified time horizon.

Figure 9A:
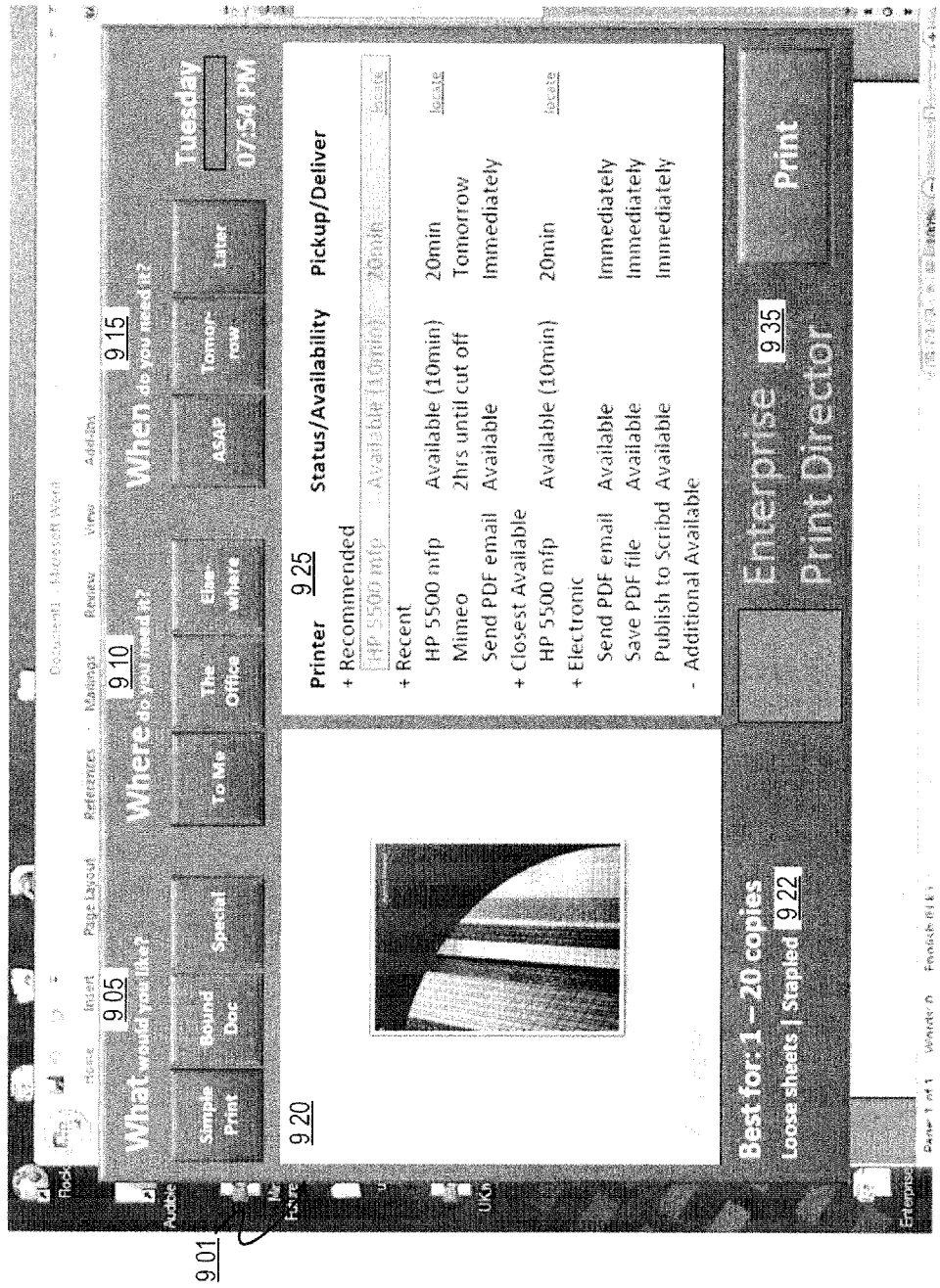
FIGS. 9A-9B show aspects of an implementation of print window user interfaces in one embodiment of Manager operation.
Figure 9B:
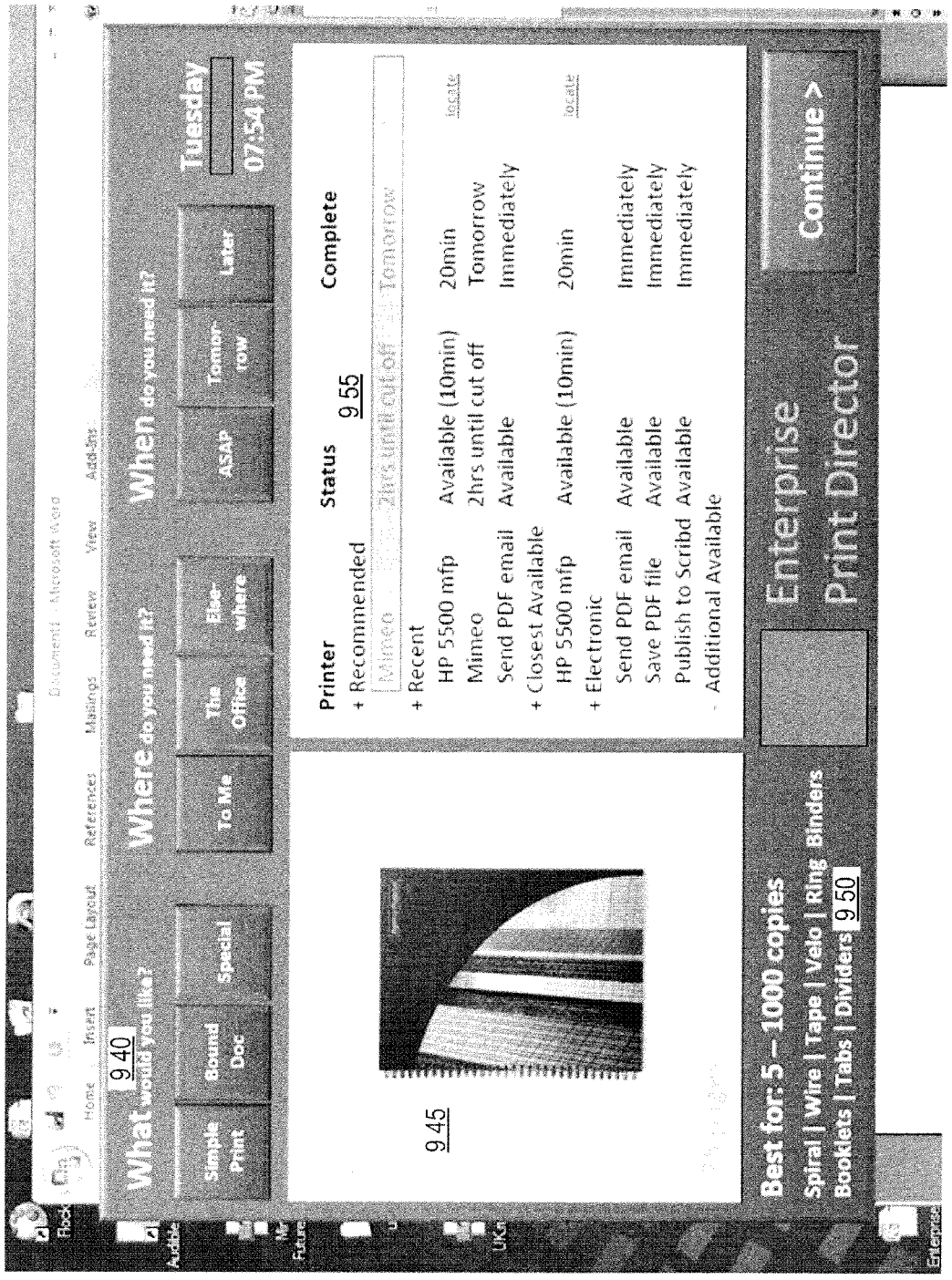

FIGS. 9A-9B show aspects of an implementation of print window user interfaces in one embodiment of Manager operation. In FIG. 9A, a print service UI window 901 is displayed, providing a user with a plurality of selectable print options and/or print product configurations to define a print job. Among the options provided are interface elements allowing the user to specify "What" 905, "Where" 910, and "When" 915. The "What" elements 905 may be manipulated, in one implementation, to specify what type of print product the user desires, such as a "simple" print, a bound document, or other special print product formats (e.g., calendar, report, poster, etc.). In various implementations, the print service UI may further admit additional information about what type of print product is desired, such as the number of copies or pages, color, quality, paper type, ink type, binding type, and/or the like. A preview of the printable content configured in accordance with print product specification from 905 may be provided for display to the user, such as via an integrated preview window 920. Additional options associated with the selected type of print job may be provided, such as at 922, to allow the user to further refine his or her print job specifications. In the illustrated implementation, the user is permitted to specify loose or stapled sheets for the selected "simple"

print. The UI also indicates that the selected print type is best suited for 1-20 copies. The "Where" elements may be manipulated, in one implementation, to specify a location at which the print product is needed or should be delivered (e.g., at the user's current location, at the user's office, or some other location). The "Where" elements 910 may, in one implementation, be populated based on information queried from a user profile, such as stored locations associated with the user, common locations used by the user, and/or the like. In an alternative implementation, the "Where" elements may be manipulated to specify a desired print destination. The "When" elements 915 may be manipulated, in one implementation, to specify when the print product is needed or desired by the user (e.g., as soon as possible, tomorrow, or some later time). In one implementation, the user may manipulate "When" elements to specify a delivery time and/or date for off-site and/or third party generated print products. The print service UI 901 may further include a window 925 displaying various available print destinations and options. In the illustrated implementation, the print options window 925 shows the printer and/or print destination, associated status and/or availability, and the expected time for pickup and/or delivery associated therewith. Print destination options may, in some implementations, be displayed based on rankings, categorization, and/or the like. For example, in the illustrated implementation, a particular print destination (HP 5500 mfp) is shown as a recommended print destination. Other categories in the displayed implementation include recent print destinations, closest available print destinations, electronic format print destinations, and/or the like. In one implementation, selection of print job specifications at 905, 910, 915 and/or 922 may affect the print destination options provided for selection at 925, and/or the rankings and/or categorizations of print destination options. In another implementation, selection of a print destination at 925 may affect print job specifications available at 905, 910, 915 and/or 922. A print button is included at 935 to initiate the print process once the user's print product specifications have been set, a print destination option selected at 925, and/or the like.

In FIG. 9B, the user has selected a bound document at 940, and the corresponding bound document preview is shown at 945. Further binding options are displayed at 950, selection of which may affect the preview displayed at 945, as well as attributes and/or metadata associated with the print job that is transmitted to one or more selected print destinations. In accordance with the change in desired print job type, the recommended print destination at 955 has also changed from FIG. 9A, now indicating a PSP as best suited to handle the desired print job. The UI also indicates that a cutoff time exists by which the user must submit the print job in order to receive the print product by a specified time horizon. In another implementation, the cutoff may reflect a time at which a print destination may become available for receiving new print jobs.

The Manager may yield a wide variety of benefits to participating entities. By way of example only, some potential participants and their benefits may include:

Enterprise customer: Reduced costs (reduced footprint, reduced hardware/fixed costs).

End User: Faster access to more printed products (creates compliance by making things more transparent for the end user).

Partnering agency: Although reduces total footprint, it ensures that the fixed assets are maximized, increasing margin.

Manager administrator: Provides a contracted revenue stream.

Manager Controller

Figure 10:
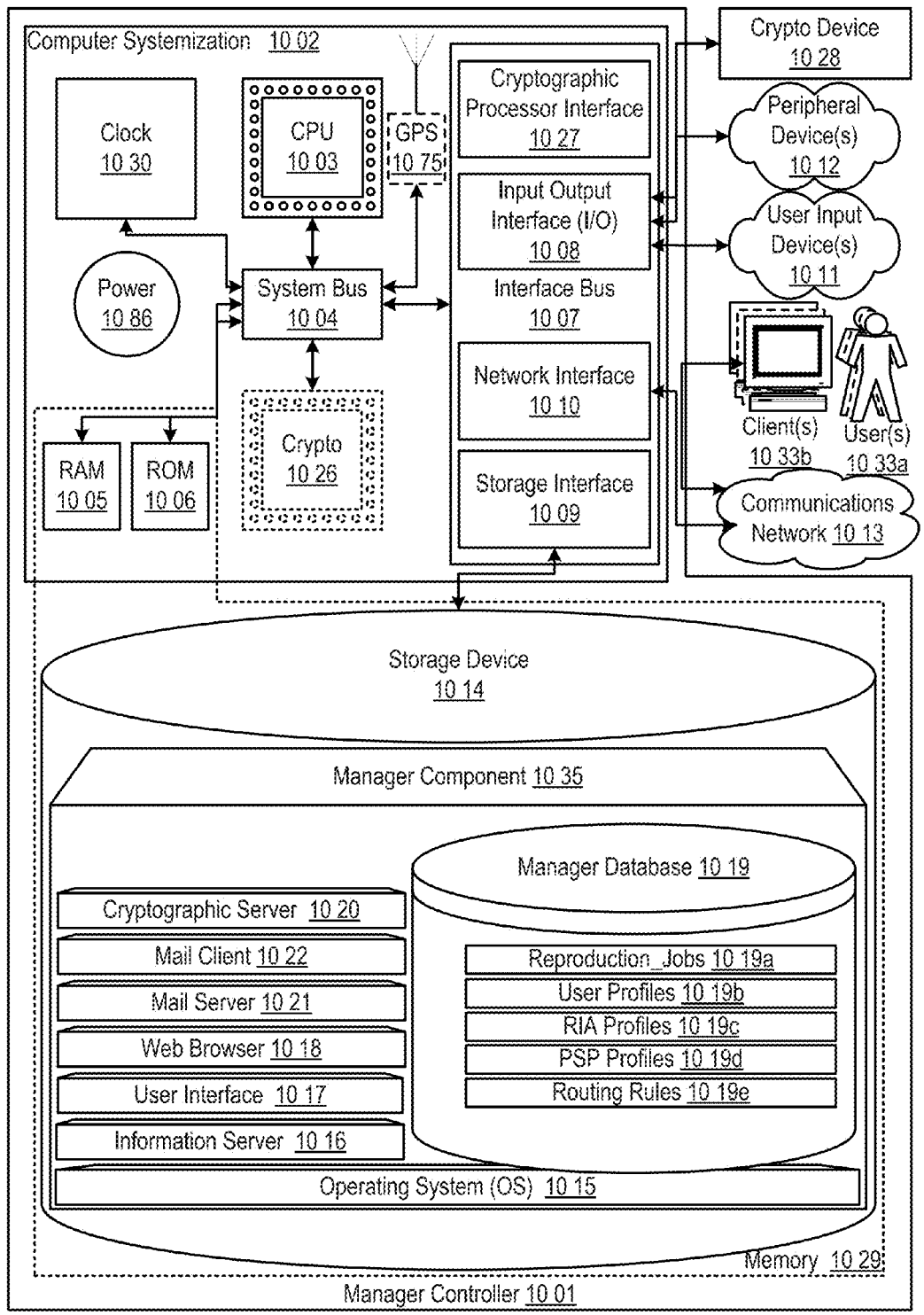
FIG. 10 is of a block diagram illustrating embodiments of the present invention of a Manager controller.

FIG. 10 of the present disclosure illustrates inventive aspects of a Manager controller 1001 in a block diagram.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the Manager controller 1001 may be connected to and/or communicate with entities such as, but not limited to: one or more users from user input devices 1011; peripheral devices 1012; a cryptographic processor device 1028; and/or a communications network 1013.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Manager controller 1001 may be based on common computer systems that may comprise, but are not limited to, components such as: a computer systemization 1002 connected to memory 1029.

Computer Systemization

A computer systemization 1002 may comprise a clock 1030, central processing unit (CPU) 1003, a read only memory (ROM) 1006, a random access memory (RAM)

1005, and/or an interface bus 1007, and most frequently, although not necessarily, the foregoing are all interconnected and/or communicating through a system bus 1004. Optionally, the computer systemization may be connected to an internal power source 1086. Optionally, a cryptographic processor 1026 and/or a global positioning system (GPS) component 575 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the Manager controller and beyond through various interfaces. Should processing requirements dictate a greater amount of speed, parallel, mainframe and/or super-computer architectures may similarly be employed. Alternatively, should deployment requirements dictate greater portability, smaller Personal Digital Assistants (PDAs) may be employed.

Power Source

The power source 1086 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1086 is connected to at least one of the interconnected subsequent components of the Manager thereby providing an electric current to all subsequent components. In one example, the power source 1086 is connected to the system bus component 1004. In an alternative embodiment, an outside power source 1086 is provided through a connection across the I/O 1008 interface. For example, a USB and/or IEEE 1394 connection carries both data and power across the connection and is therefore a suitable source of power.

Interface Adapters

Interface bus(es) 1007 may accept, connect, and/or communicate to a number of interface adapters, conventionally although not necessarily in the form of adapter cards, such as, but not limited to: input output interfaces (I/O) 1008, storage interfaces 1009, network interfaces 1010, and/or the like. Optionally, cryptographic processor interfaces 1027 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1009 may accept, communicate, and/or connect to a number of storage devices such as, but not limited to: storage devices 1014, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1010 may accept, communicate, and/or connect to a communications network 1013. Through a communications network 513, the Manager controller is accessible through remote clients 1033b (e.g., computers with web browsers) by users 1033a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1010 may be used to engage with various communications network types 1013. For example, multiple network interfaces may be employed to allow for the communication over broadcast, multicast, and/or unicast networks.

Input Output interfaces (I/O) 1008 may accept, communicate, and/or connect to user input devices 1011, peripheral devices 1012, cryptographic processor devices 1028, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 1011 may be card readers, dongles, finger print readers, gloves, graphics tablets, joysticks, keyboards, mouse (mice), remote controls, retina readers, trackballs, trackpads, and/or the like.

Peripheral devices 1012 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the Manager controller may be embodied as an embedded, dedicated, and/or monitor-less (i.e., headless) device, wherein access would be provided over a network interface connection.

Cryptographic units such as, but not limited to, microcontrollers, processors 1026, interfaces 1027, and/or devices 1028 may be attached, and/or communicate with the Manager controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allow for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 1029. However, memory is a fungible technology and resource; thus, any number of memory embodiments may be employed in lieu of or in concert with one another. It is to be understood that the Manager controller and/or a computer systemization may employ various forms of memory 1029. For example, a computer systemization may be configured wherein the functionality of on-chip CPU memory (e.g., registers), RAM, ROM, and any other storage devices are provided by a paper punch tape or paper punch card mechanism; of course, such an embodiment would result in an extremely slow rate of operation. In a typical configuration, memory 1029 will include ROM 1006, RAM 1005, and a storage device 1014. A storage device 1014 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 1029 may contain a collection of program and/or database components and/or data such as, but not limited to: operating system component(s) 1015 (operating system); information server component(s) 1016 (information server); user interface component(s) 1017 (user interface); Web browser component(s) 1018 (Web browser); database(s) 1019; mail server component(s) 1021; mail client component(s) 1022; cryptographic server component(s) 1020 (cryptographic server); the Manager component(s) 1035; and/or the like (i.e., collectively a component collection). These components may be stored and accessed from the storage devices and/or from storage devices accessible through an interface bus. Although non-conventional program components such as those in the component collection, typically, are stored in a local storage device 1014, they may also be loaded and/or stored in memory such as: peripheral devices, RAM, remote storage facilities through a communications network, ROM, various forms of memory, and/or the like.

Operating System

The operating system component 1015 is an executable program component facilitating the operation of the Manager controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Manager controller to communicate with other entities through a communications network 1013. Various communication protocols may be used by the Manager controller as a subcarrier transport mechanism for interaction, such as, but not limited to: multicast, TCP/IP, UDP, unicast, twitter, SMS, SMTP, and/or the like.

Information Server

An information server component 1016 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, Java, JavaScript, Practical Extraction Report Language (PERL), Hypertext Pre-Processor (PHP), pipes, Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Manager controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Manager database 1019, operating systems, other program components, user interfaces, Web browsers, and/or the like.

Access to the Manager database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Manager. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Manager as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/Vista (i.e., Aero)/XP, or Unix's X-Windows (e.g., which may include additional Unix graphic interface libraries and layers such as K Desktop Environment (KDE), mythTV and GNU Network Object Model Environment (GNOME)), provide a baseline and means of accessing and displaying information graphically to users.

A user interface component 1017 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact with, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1018 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the Manager enabled nodes. The combined application may be nugatory on systems employing standard Web browsers.

Mail Server

A mail server component 1021 is a stored program component that is executed by a CPU 1003. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Manager.

Access to the Manager mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1022 is a stored program component that is executed by a CPU 1003. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1020 is a stored program component that is executed by a CPU 1003, cryptographic processor 1026, cryptographic processor interface 1027, cryptographic processor device 1028, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Manager may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the Manager component to engage in secure transactions if so desired. The cryptographic component facilitates the secure accessing of resources on the Manager and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Manager Database

The Manager database component 1019 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Manager database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data, but may have other types of functionality encapsulated within a given object. If the Manager database is implemented as a data-structure, the use of the Manager database 1019 may be integrated into another component such as the Manager component 1035. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1019 includes several tables 1019*a-c*. A Reproduction_Jobs table 1019*a* may include fields such as, but not limited to: job_ID, job_name, user_name, authorization, document_ID, document_classification, number_of_copies, reproduction_method, reproduction_destination, warnings, special_handling_instructions, schedule_ID, schedule_last_updated, schedule_creator, access_restrictions, and/or the like. A User Profiles table 1019b may include fields such as, but not limited to: user_ID, name, address, contact_information, preferences, settings, attributes, reproduction_history, job_ID(s), preferred_PSP_ID(s), payment information, and/or the like. A RIA Profiles table 1019c may include fields such as, but not limited to: RIA_ID, RIA_type, RIA_name, code_path(s), url(s), and/or the like. A PSP Profiles table 1019d may include fields such as, but not limited to: PSP_ID, name, address, contact_information, settings, attributes, reproduction_history, job_ID(s), User_ID(s), capabilities, printers, cutoffs, SLAs, restrictons, availability, and/or the like. A Routing Rules table 1019e may include fields such as, but not limited to: rule_ID, user_ID(s), PSP_ID(s), RIA_ID(s), rule_name, rule_type, rule_definition, and/or the like. These tables may support and/or track multiple entity accounts on the Manager controller.

In one embodiment, the Manager database may interact with other database systems. For example, employing a distributed database system, queries and data access by search Manager component may treat the combination of the Manager database, an integrated data security layer database as a single database entity.

In one embodiment, user programs may contain various user interface primitives, which may serve to update the Manager. Also, various accounts may require custom database tables depending upon the environments and the types of clients the Manager may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1019a-e. The Manager may be configured to keep track of various settings, inputs, and parameters via database controllers.

The Manager database may communicate to and/or with other components in a component collection, including itself, and/or facilities of the like. Most frequently, the Manager database communicates with the Manager component, other program components, and/or the like. The database may contain, retain, and provide information regarding other nodes and data.

The Manager Component

The Manager component 1035 is a stored program component that is executed by a CPU. In one embodiment, the Manager component incorporates any and/or all combinations of the aspects of the Manager that was discussed in the previous figures. As such, the Manager affects accessing, obtaining and the provision of information, services, transactions, and/or the like across various communications networks.

The Manager component is configurable to access, calculate, engage, exchange, generate, identify, instruct, match, process, search, serve, store, and/or facilitate document analysis and/or document reproduction, generation, administration, termination, and/or the like and use of the Manager.

The Manager component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, WebObjects, and/or the like. In one embodiment, the Manager server employs a cryptographic server to encrypt and decrypt communications. The Manager component may communicate to and/or with other components in a component collection, including itself, and/or facilities of the like. Most frequently, the Manager component communicates with the Manager database, operating systems, other program components, and/or the like. The Manager may contain, communicate, generate, obtain, and/or provide program component, system, user, and/or data communications, requests, and/or responses.

Distributed Managers

The structure and/or operation of any of the Manager node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Manager controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor-implemented method for routing document reproduction requests, comprising:
a print product traffic controller executing on a computer system receiving a document reproduction request corresponding to an electronic document, wherein the reproduction request comprises printable content and reproduction metadata;
the print product traffic controller analyzing the reproduction metadata of the document reproduction request and data corresponding to a plurality of reproduction facilities to determine a destination reproduction facility, wherein the analyzed reproduction metadata includes at least: a set of reproduction specifications, a reproduction product delivery destination, and a reproduction product delivery time, and wherein the analyzing includes:
assigning each of the plurality of reproduction facilities to at least one of a plurality of pre-defined categories;
providing a categorized listing of reproduction facilities for presentation to a user originating the reproduction request via a user interface, wherein the categorized listing includes a plurality of categories corresponding to the pre-defined categories, each category including at least one reproduction facility available for use according to the reproduction metadata and the data corresponding to the reproduction facility; and
receiving a selection of the destination reproduction facility via the user interface; and
the print product traffic controller directing the document for processing by the destination reproduction facility.

2. The method of claim 1, wherein the reproduction request includes a user identifier.

3. The method of claim 2, further comprising:
retrieving a user profile based on the user identifier; and
querying user preferences from the user profile, wherein the destination reproduction facility determination is further based on the user preferences, and wherein the user preferences include at least: a set of personal preferences and a user print history.

4. The method of claim 1, wherein the destination reproduction facility comprises one of: a printer device local to a requesting user or an electronic format print destination.

5. The method of claim 1, wherein the destination reproduction facility comprises an enterprise reproduction department.

6. The method of claim 1, wherein the destination reproduction facility comprises a remote print service provider.

7. The method of claim 1, wherein the analyzing uses reproduction facility records for a plurality of reproduction facilities.

8. The method of claim 7, wherein the analyzing further comprises:
querying reproduction facility capabilities from reproduction facility records; and
comparing the reproduction metadata to the reproduction facility capabilities associated with each reproduction facility to determine the destination reproduction facility.

9. The method of claim 7, wherein the reproduction facility records comprise reproduction facility rankings.

10. The method of claim 9, wherein the print product traffic controller automatically selects a reproduction facility having a highest reproduction facility ranking as a recommended destination reproduction facility.

11. The method of claim 1, wherein the analyzing further comprises configuring the categorized listing of available reproduction facilities based on reproduction facility capabilities for each of the available reproduction facilities and the pre-defined categories.

12. The method of claim 11, wherein the reproduction facility capabilities comprise reproduction facility rankings and wherein the listing of reproduction facilities is configured as an ordered list with an order determined by the reproduction facility rankings.

13. The method of claim 11, wherein the listing of reproduction facilities is configured as a grouped list with groupings determined by the assignment of reproduction facilities to the pre-defined categories, and wherein each reproduction facility listing includes: a status of a corresponding reproduction facility and an estimated time by which delivery of the document reproduction request can be completed.

14. The method of claim 1, wherein the document reproduction request is received from a print driver.

15. The method of claim 1, wherein receiving a document reproduction request further comprises:
   receiving a reproduction request indicator directed to media content administered by a web application;
   selecting a media content capture routine based on the reproduction request indicator; and
   capturing the media content as a formatted document based on the media content capture routine.

16. The method of claim 15, further comprising:
   retrieving a reproduction dialog user interface configured to admit reproduction specifications based on the reproduction request indicator;
   providing the reproduction dialog user interface for display to a user;
   receiving reproduction specifications via the reproduction dialog user interface; and
   configuring the formatted document based on the received reproduction specifications.

17. The method of claim 16, wherein providing the reproduction dialog user interface is further based on the web application.

18. The method of claim 15, wherein the web application comprises a rich internet application.

19. The method of claim 1, wherein receiving, analyzing, comparing and directing are performed on a printer device.

20. The method of claim 1, wherein directing the document for processing by the destination reproduction facility further comprises:
   providing the document as a second reproduction request to a system which:
      receives the second document reproduction request;
      analyzes the second document reproduction request based on a second set of reproduction request criteria to determine a reproduction request classification;
      compares the reproduction request classification to a plurality of reproduction facility records to determine a reproduction facility; and
      directs the document to the reproduction facility.

21. The method of claim 1, wherein the analyzing the reproduction metadata includes: the print product traffic controller dynamically adjusting at least one of: the reproduction metadata in response to a change in a selected reproduction facility listing or the categorized listing of reproduction facilities in response to a change in the reproduction metadata.

22. The method of claim 1, wherein the analyzing includes:
   the print product traffic controller determining that no reproduction facility is available to meet all requirements defined in the reproduction metadata; and
   the print product traffic controller gradually degrading the set of reproduction specifications until at least one reproduction facility is available to meet the degraded set of reproduction specifications.

23. An apparatus for routing document reproduction requests, comprising:
   a processor;
   a memory in communication with the processor and containing program instructions, wherein the processor executes the program instructions contained in the memory to perform the following:
   receive a document reproduction request corresponding to an electronic document, wherein the reproduction request comprises printable content and reproduction metadata;
   analyze the reproduction metadata of the document reproduction request and data corresponding to a plurality of reproduction facilities to determine a destination reproduction facility, wherein the analyzed reproduction metadata includes at least: a set of reproduction specifications, a reproduction product delivery destination, and a reproduction product delivery time, and wherein the analyzing includes:
      determining that no reproduction facility is available to meet all requirements defined in the reproduction metadata;
      gradually degrading the set of reproduction specifications until at least one reproduction facility is available to meet the degraded set of reproduction specifications;
      providing a categorized listing of reproduction facilities for presentation to a user originating the reproduction request via a user interface, wherein the categorized listing includes a plurality of categories, each category including at least one reproduction facility available for use according to the reproduction metadata and the data corresponding to the reproduction facility; and
      receiving a selection of the destination reproduction facility via the user interface; and
   direct the document for processing by the destination reproduction facility.

24. A non-transitory processor-accessible medium for routing document reproduction requests, comprising:
   processor readable instructions stored in the processor-accessible storage medium, wherein the processor readable instructions are executable by a processor to:
   receive a document reproduction request corresponding to an electronic document, wherein the reproduction request comprises printable content and reproduction metadata;
   analyze the reproduction metadata of the document reproduction request and data corresponding to a plurality of reproduction facilities to determine a destination reproduction facility, wherein the analyzed reproduction metadata includes at least: a set of reproduction specifications, a reproduction product delivery destination, and a reproduction product delivery time, and wherein the analyzing includes:
      providing a categorized listing of reproduction facilities for presentation to a user originating the reproduction request via a user interface, wherein the categorized listing includes a plurality of categories, each category including at least one reproduction facility available for use according to the reproduction metadata and the data corresponding to the reproduction facility;
      dynamically adjusting at least one of: the reproduction metadata in response to a change in a selected reproduction facility listing or the categorized listing of reproduction facilities in response to a change in the reproduction metadata; and
      receiving a selection of the destination reproduction facility via the user interface; and
   direct the document for processing by the destination reproduction facility.

25. An electronic system for routing document reproduction requests, comprising:
- means to receive a document reproduction request corresponding to an electronic document, wherein the reproduction request comprises printable content and reproduction metadata;
- means to analyze the reproduction metadata of the document reproduction request based on a set of reproduction request criteria and data corresponding to a plurality of reproduction facilities to determine a destination reproduction facility, wherein the analyzed reproduction metadata includes at least: a set of reproduction specifications, a reproduction product delivery destination, and a reproduction product delivery time, and wherein the analyzing includes:
  - assigning each of the plurality of reproduction facilities to at least one of a plurality of pre-defined categories;
  - providing a categorized listing of reproduction facilities for presentation to a user originating the reproduction request via a user interface, wherein the categorized listing includes a plurality of categories corresponding to the pre-defined categories, each category including at least one reproduction facility available for use according to the reproduction metadata and the data corresponding to the reproduction facility; and
  - receiving a selection of the destination reproduction facility via the user interface; and
- means to direct the document for processing by the destination reproduction facility.

26. The system of claim 25, wherein the analyzing further includes:
- determining that no reproduction facility is available to meet all requirements defined in the reproduction metadata; and
- gradually degrading the set of reproduction specifications until at least one reproduction facility is available to meet the degraded set of reproduction specifications.

27. A computer-implemented method for routing document reproduction requests, the method comprising:
- a print product traffic controller executing on a computer system receiving reproduction metadata corresponding to a document reproduction request for an electronic document, wherein the receiving includes:
  - providing a user interface for presentation to a user, wherein the user interface includes:
    - a reproduction metadata portion for enabling a user to designate the reproduction metadata, wherein the reproduction metadata includes at least: a set of reproduction specifications, a reproduction product delivery destination, and a reproduction product delivery time; and
    - a reproduction facility listing portion for presenting a set of reproduction facility listings, wherein each of the set of reproduction facility listings is assigned to one of a plurality of pre-defined categories, and wherein each reproduction facility listing includes: a status of a corresponding reproduction facility and an estimated time by which delivery of the document reproduction request can be completed; and
- the print product traffic controller analyzing the reproduction metadata of the document reproduction request to determine a set potential reproduction facilities for inclusion in the set of reproduction facility listings, wherein the analyzing includes:
  - determining that no reproduction facility is available to meet all requirements defined in the reproduction metadata; and
  - gradually degrading the set of reproduction specifications until at least one reproduction facility is available to meet the degraded set of reproduction specifications.

* * * * *